(12) United States Patent
Nosker et al.

(10) Patent No.: US 11,479,652 B2
(45) Date of Patent: Oct. 25, 2022

(54) COVALENT CONJUGATES OF GRAPHENE NANOPARTICLES AND POLYMER CHAINS AND COMPOSITE MATERIALS FORMED THEREFROM

(71) Applicant: Rutgers, The State University of New Jersey, New Brunswick, NJ (US)

(72) Inventors: Thomas J. Nosker, Stockton, NJ (US); Jennifer K. Lynch-Branzoi, Franklin Park, NJ (US); Justin W. Hendrix, Washington, DC (US); Bernard H. Kear, Whitehouse Station, NJ (US); Gordon Chiu, Summit, NJ (US); Stephen Tse, Warren, NJ (US)

(73) Assignee: RUTGERS, THE STATE UNIVERSITY OF NEW JERSEY, New Brunswick, NJ (US)

( * ) Notice: Subject to any disclaimer, the term of this patent is extended or adjusted under 35 U.S.C. 154(b) by 440 days.

(21) Appl. No.: 16/596,303

(22) Filed: Oct. 8, 2019

(65) Prior Publication Data
US 2020/0048425 A1 Feb. 13, 2020

Related U.S. Application Data

(63) Continuation-in-part of application No. 15/900,137, filed on Feb. 20, 2018, now Pat. No. 11,098,175.
(Continued)

(51) Int. Cl.
*C08K 3/04* (2006.01)
*B29C 48/67* (2019.01)
(Continued)

(52) U.S. Cl.
CPC ............... *C08K 3/04* (2013.01); *B29C 48/56* (2019.02); *B29C 48/67* (2019.02); *C08J 3/201* (2013.01);
(Continued)

(58) Field of Classification Search
CPC ..... C08K 3/04; C08K 2201/011; B29C 48/67; B29C 48/56; C08J 5/005; C08J 5/230022; C08J 2381/06; B29K 2105/162
(Continued)

(56) References Cited

U.S. PATENT DOCUMENTS 5,298,214 A 3/1994 Morrow et al.
5,789,477 A 8/1998 Nosker et al.
(Continued)

FOREIGN PATENT DOCUMENTS

CN 101817516 A 9/2010
CN 103842422 A 6/2014
(Continued)

OTHER PUBLICATIONS

Lu, et al.: "Preparation of Polyethylene/Expanded Graphite Intercalated Composites by In-situ Expanding Method", China Plastics, Jul. 31, 2009, vol. 23, No. 7, pp. 49-54.
(Continued)

*Primary Examiner* — Ling Siu Choi
*Assistant Examiner* — Ronald Grinsted
(74) *Attorney, Agent, or Firm* — Fox Rothschild LLP

(57) ABSTRACT

A method for forming a graphene-reinforced polymer matrix composite is disclosed. The method includes distributing graphite microparticles into a molten thermoplastic polymer phase; and applying a succession of shear strain events to the molten polymer phase so that the molten polymer phase exfoliates the graphite successively with each event until at least 50% of the graphite is exfoliated to form a distribution in the molten polymer phase of single- and multi-layer graphene nanoparticles less than 50 nanometers thick along the c-axis direction.

19 Claims, 14 Drawing Sheets

Related U.S. Application Data which is a continuation of application No. 14/437,040, filed as application No. PCT/US2013/031495 on Mar. 14, 2013, now Pat. No. 9,896,565.

(60) Provisional application No. 61/716,461, filed on Oct. 19, 2012.

(51) Int. Cl.

| | | |
|---|---|---|
| *B29C 48/56* | (2019.01) | |
| *C08J 3/20* | (2006.01) | |
| *C08J 5/00* | (2006.01) | |
| *B29K 105/16* | (2006.01) | |

(52) U.S. Cl.
CPC .......... *C08J 5/005* (2013.01); *B29K 2105/162* (2013.01); *C08J 2300/22* (2013.01); *C08J 2381/06* (2013.01); *C08K 2201/011* (2013.01)

(58) Field of Classification Search
USPC ........................................................ 524/496
See application file for complete search history.

(56) References Cited

U.S. PATENT DOCUMENTS

| | | | |
|---|---|---|---|
| 5,916,932 | A | 6/1999 | Nosker et al. |
| 6,042,765 | A | 3/2000 | Sugahara et al. |
| 6,962,431 | B1 | 11/2005 | Luker |
| 7,465,605 | B2 | 12/2008 | Raravikar et al. |
| 7,745,528 | B2 | 6/2010 | Prud'Homme et al. |
| 7,906,053 | B1 | 3/2011 | Torkelson et al. |
| 8,167,190 | B1 | 5/2012 | Bullock et al. |
| 8,303,876 | B1 | 11/2012 | Torkelson et al. |
| 8,734,696 | B1 | 5/2014 | Torkelson et al. |
| 8,871,826 | B2 | 10/2014 | Butzloff et al. |
| 9,139,440 | B2 | 9/2015 | Felisar et al. |
| 9,896,565 | B2 | 2/2018 | Nosker et al. |
| 10,253,154 | B2 | 4/2019 | Nosker et al. |
| 10,329,391 | B2 | 6/2019 | Nosker et al. |
| 11,098,175 | B2 | 8/2021 | Nosker et al. |
| 11,174,366 | B2 | 11/2021 | Nosker et al. |
| 11,225,558 | B2 | 1/2022 | Nosker et al. |
| 2005/0186378 | A1 | 8/2005 | Bhatt |
| 2006/0047052 | A1 | 3/2006 | Barrera et al. |
| 2006/0062986 | A1 | 3/2006 | Magario et al. |
| 2007/0099792 | A1 | 5/2007 | Khabashesku et al. |
| 2008/0279756 | A1 | 11/2008 | Zhamu et al. |
| 2009/0087661 | A1 | 4/2009 | Eder |
| 2010/0147188 | A1 | 6/2010 | Mamak et al. |
| 2010/0317790 | A1 | 12/2010 | Jang et al. |
| 2011/0017955 | A1 | 1/2011 | Zhamu et al. |
| 2011/0114189 | A1 | 5/2011 | Crain et al. |
| 2011/0133134 | A1 | 6/2011 | Varma et al. |
| 2011/0143058 | A1 | 6/2011 | Nosker et al. |
| 2011/0186789 | A1 | 8/2011 | Samulski et al. |
| 2011/0260116 | A1 | 10/2011 | Plee et al. |
| 2012/0065299 | A1 | 3/2012 | Lukehart et al. |
| 2012/0068124 | A1 | 3/2012 | Dickinson et al. |
| 2012/0142832 | A1 | 6/2012 | Varma et al. |
| 2012/0264836 | A1* | 10/2012 | Felisari .................. C08J 9/0066 521/146 |
| 2012/0328946 | A1 | 12/2012 | Bosnyak et al. |
| 2013/0018204 | A1 | 1/2013 | Jeon et al. |
| 2013/0072613 | A1 | 3/2013 | Miltner et al. |
| 2013/0295367 | A1 | 11/2013 | Compton et al. |
| 2014/0042390 | A1 | 2/2014 | Gruner et al. |
| 2014/0058046 | A1 | 2/2014 | Sawa et al. |
| 2014/0083752 | A1 | 3/2014 | Walczak et al. |
| 2014/0094541 | A1 | 4/2014 | Shah et al. |
| 2014/0141257 | A1 | 5/2014 | Ranade et al. |
| 2014/0183415 | A1 | 7/2014 | Song |
| 2015/0267030 | A1 | 9/2015 | Nosker et al. |
| 2016/0009561 | A1 | 1/2016 | Coleman et al. |
| 2016/0332136 | A1 | 11/2016 | Zhang et al. |
| 2017/0207000 | A1 | 7/2017 | Prestayko et al. |
| 2017/0218141 | A1 | 8/2017 | Nosker et al. |
| 2017/0352868 | A1 | 12/2017 | Zhamu et al. |
| 2020/0362137 | A1 | 11/2020 | Nosker et al. |
| 2021/0163747 | A1 | 6/2021 | So et al. |

FOREIGN PATENT DOCUMENTS

| | | |
|---|---|---|
| CN | 104884243 A | 9/2015 |
| CN | 104945659 A | 9/2015 |
| CN | 104945694 A | 9/2015 |
| CN | 105324241 A | 2/2016 |
| CN | 107074552 A | 8/2017 |
| EP | 2287244 A1 | 2/2011 |
| EP | 2612889 A1 | 7/2013 |
| EP | 2905256 A1 | 8/2015 |
| JP | H08-053571 A | 2/1996 |
| JP | 2003-138145 A | 5/2003 |
| JP | 2003-531802 A | 10/2003 |
| JP | 2007-524735 A | 8/2007 |
| JP | 2008-266577 A | 11/2008 |
| JP | 2009-542839 A | 12/2009 |
| JP | 2011-038078 A | 2/2011 |
| JP | 2011513167 A | 4/2011 |
| JP | 2012500179 A | 1/2012 |
| JP | 2012136712 A | 7/2012 |
| JP | 2013018825 A | 1/2013 |
| JP | 2013-507477 A | 3/2013 |
| JP | 2013-233790 A | 11/2013 |
| JP | 2015537075 A | 12/2015 |
| JP | 2016-509122 A | 3/2016 |
| JP | 2016519191 A | 6/2016 |
| JP | 6393743 B2 | 9/2018 |
| JP | 2018138667 A | 9/2018 |
| JP | 2018-158453 A | 10/2018 |
| JP | 2019002021 A | 1/2019 |
| JP | 6633703 B2 | 1/2020 |
| KR | 10-2011-0018024 A | 2/2011 |
| KR | 10-2012-0009978 A | 2/2012 |
| TW | 201315763 A | 4/2013 |
| TW | 201915053 A | 4/2019 |
| WO | 07145918 A2 | 12/2007 |
| WO | 2009018204 A1 | 2/2009 |
| WO | 2009029984 A1 | 3/2009 |
| WO | 201007763 | 9/2010 |
| WO | 2010115173 A1 | 10/2010 |
| WO | 2011042800 A1 | 4/2011 |
| WO | 2012/133303 A1 | 1/2012 |
| WO | 2012013303 A1 | 2/2012 |
| WO | 2012020099 A1 | 2/2012 |
| WO | 2012049121 | 4/2012 |
| WO | 2013013070 A2 | 1/2013 |
| WO | 2013058181 A1 | 4/2013 |
| WO | 2014062226 A1 | 4/2014 |
| WO | 20140172619 A1 | 10/2014 |
| WO | 2015044478 | 4/2015 |
| WO | 2016018995 A1 | 2/2016 |
| WO | 16106312 A2 | 6/2016 |

OTHER PUBLICATIONS

Wakabayashi, et al.: "Polymer-Graphite Nanocomposites: Effective Dispersion and Major Property Enhancement via Solid-State Shear Pulverization", Macromolecules, American Chemical Society, Feb. 29, 2008, vol. 41, No. 6, pp. 1905-1908, XP-002743181.

Bao, et al.: "Preparation of Graphene by Pressurized Oxidation and Multiplex Reduction and its Polymer Nanocomposites by Masterbatch-Based Melt Blending", Journal of Materials Chemistry, Jan. 1, 2012, vol. 22, No. 13, pp. 6088-6096.

Randcastle Extrusion Systems, Inc., Nov. 1, 2006, XP055279030, retrieved from the Internet: URL: http://www.feedscrewdesigns.com/ubb/Forum1/HTML/000521 html [retrieved on Jun. 9, 2016], pp. 1-3.

Eda, et al.: Chemically Derived Graphene Oxide: Towards Large-Area Thin-Film Electronics and Optoelectronics: Advanced Materials, 2010, vol. 22, pp. 2392-2415.

(56) References Cited

OTHER PUBLICATIONS

Novoselov et al., "Electric Field Effect in Atomically Thin Carbon Films," Science (2004); 306:666-669.
Nixon, A.: "Understanding Graphene—Part 1", Feb. 4, 2016. [retrieved Nov. 18, 2016], Retrieved from the Internet: <http://investorintel.com/technology-metals-intel/understanding-graphene-part-1-graphene-and-graphite/>.
Choudhary, et al.: "Polymer/Carbon Nanotube Nanocomposites", Aug. 17, 2011, Chapter 4, pp. 65-90, Retrieved from the Internet: <http://www.intechopen.com/books/carbon-nanotubes-polymer-nanocomposites/polymer-carbon-nanotube-nanocomposites>.
NPL_ThomasSwan; "Elicarb Graphene Epoxy Dispersion", Advanced Materials, Publication [unknown].
NPL_Xie, et al. "Boron Nitride Nanosheets As New Barrier Additive For Plastic Packaging", New/Nano Materials. Retrieved from the Internet <URL: https://www.tcd.ie./Physics/research/groups/1d-nanostructures/files/posters/NewNano%20-%2034_poster_Shaobo%20Xie.pdf>, Publication [unknown, no earlier than 2013].
NPL_Jonathan N. Coleman: "Liquid Exfoliation of Defect-Free Graphene", Accounts of Chemical Research, 2013, vol. 16, No. 1, pp. 14-22.
NPL_Paton et al.: "Scale-up of Liquid Exfoliation of Graphene", Thomas Swan Advanced Materials, Retrieved from the Internet: URL: https://www.tcd.ie/Physics/research/groups/1d-nanostructures/files/posters/ChemOnTubes%20Poster%20KP.pdf>. Publication [unknown, not earlier than 2014].
NPL_Paton et al.: "Scalable Production of Large Quantities of Defect-Free Few-Layer Graphene by Shear Exfoliation in Liquids", Nature Materials, Jun. 2014, vol. 13, pp. 624-630.
Tewatia, et al.: "High Shear Melt-Processing of Polyetheretherketone Enhanced Polysulfone Immiscible Polymer Blends", Antec Orlando, The Plastics Technology Conference, Orange County Convention Center, Orlando, FL, May 7-10, 2018.
Tewatia, et al.: "Multi-Scale Carbon (Micro/Nano) Fiber Reinforcement of Polyetheretherketone Using High Shear Melt-Processing", Fibers, 2017, 5, 32; doi:10.3390/fib5030032, pp. 1-11.
Lynch, et al.: Applying Immiscible Polymer Blend Concepts to Achieve an Amplified Orientation and Property Effect on Multi-scale Reinforced Compositions, Sep. 2012.
Luker, K., "Summary Results of a Novel Single Screw Compounder", SPE-ANTEC Technical Papers, 2007, pp. 459-463.
Luker, K., "Randcastle Extrusion Systems, Inc—Microtruder Brochure", III, 2008.
Lynch, et al.: "Development of Novel One-Step Hybrid Processing", SPE-ANTEC Technical Papers, 2010, pp. 2076-2080.
Jordhamo, et al.: "Phase Continuity and Inversion in Polymer Blends and Simultaneous Interpenetrating Networks", Polymer Engineering and Science, vol. 26, No. 8, Apr. 1986, pp. 517-524.
Whieb, Nofel Z: "Processing, Characteristics and Properties of NT-Enhanced PA 66", Published May 2, 2018, A dissertation submitted to the Graduate School-New Brunswick, Rutgers, The State University of New Jersey, Oct. 2017.
Paton, et al.: Scalable Production of Large Quantities of Defect-Free, Few-Layer Graphene by Shear Exfoliation in Liquids, Nature Mater, 13, Apr. 20, 2014 (Apr. 20, 2014) retrieved via the internet on Dec. 9, 2019 (Dec. 9, 2019) <url:https://www.nature.com/articles/nmat3944> Abstract.
Diez-Pascual, et al.: "High-Performance Nanocomposites Based on Polyetherketones", Progress In Materials Science, Pergamon Press, GB, vol. 57, No. 7, Mar. 4, 2012 (Mar. 4, 2012), pp. 1106-1190, XP028514432, ISSN: 0079-6425, DOI: 10.1016/J.PMATSCI.2012.03.003 [retrieved on Mar. 29, 2012].
Rangari et al.: "Alignment of Carbon Nanotubes and Reinforcing Effects in Nylon-6 Polymer Composite Fibers", Nanotechnology Instititute of Physics Publishing, GB, vol. 19, No. 24, Jun. 18, 2008 (Jun. 18, 2008), pp. 1-9, XP002679937, ISSN: 0957-4484, DOI: 001:10.1088/0957-1484/19/24/245703 [retrieved on May 12, 2008].
Peeterbroeck, et al.: "How Carbon Nanotube Crushing Can Improve Flame Retardant Behaviour in Polymer Nanocomposites?", Macromolecular Rapid Communications, vol. 28, No. 3, Feb. 2, 2007 (Feb. 2, 2007), pp. 260-264, XP055669652, DE, ISSN: 1022-1336, DOI: 10.1002/marc.200600614.
Dooher, et al.: "Novel thermoplastic yarn for the through-thickness reinforcement of fibre-reinforced polymer composites", Journal of Thermoplastic Composite Materials, 2018, vol. 31(12), pp. 1619-1633.
Liu et al.: "A Controllable Self-Assembly Method for Large-Scale Synthesis of Graphene Sponges and Free-Standing Graphene Films", Advanced Functional Materials, 2010, 20, 1930-1936, DOI: 10.1002/adfm.201000287 (XP-001554543).

\* cited by examiner

COVALENT CONJUGATES OF GRAPHENE NANOPARTICLES AND POLYMER CHAINS AND COMPOSITE MATERIALS FORMED THEREFROM

CROSS-REFERENCE TO RELATED APPLICATIONS

The present application is a Continuation-in-part of U.S. Nonprovisional application Ser. No. 15/900,137, filed on Feb. 20, 2018, which is a Continuation of U.S. Nonprovisional application Ser. No. 14/437,040, filed on Apr. 20, 2015, now U.S. Pat. No. 9,896,565 issued Feb. 20, 2018, which is the National Phase of International Patent Application Serial No. PCT/US/13/31495, filed Mar. 14, 2013, which claims the benefit of priority under 35 U.S.C. § 119(e) of U.S. Provisional Patent Application Ser. No. 61/716,461, filed on Oct. 19, 2012, which is hereby incorporated by reference in its entirety.

FIELD OF THE INVENTION

The present invention relates to high efficiency mixing methods to transform a polymer composite containing well-crystallized graphite particles into nano-dispersed single or multi-layer graphene particles having various commercial applications.

BACKGROUND OF THE INVENTION

Polymer compositions are being increasingly used in a wide range of areas that have traditionally employed the use of other materials such as metals. Polymers possess a number of desirable physical properties, are lightweight, and inexpensive. In addition, many polymer materials may be formed into a number of various shapes and forms and exhibit significant flexibility in the forms that they assume, and may be used as coatings, dispersions, extrusion and molding resins, pastes, powders, and the like.

The various applications for which it would be desirable to use polymer compositions require materials with electrical conductivity. However, a significant number of polymeric materials fail to be intrinsically electrically or thermally conductive enough for many of these applications.

Graphene is a substance composed of pure carbon in which atoms are positioned in a hexagonal pattern in a densely packed one-atom-thick sheet. This structure is the basis for understanding the properties of many carbon-based materials, including graphite, large fullerenes, nanotubes, and the like (e.g., carbon nanotubes are generally thought of as graphene sheets rolled up into nanometer-sized cylinders). Graphene is a single planar sheet of $sp^2$ bonded carbon atoms. Graphene is not an allotrope of carbon because the sheet is of finite size and other elements can be attached at the edge in non-vanishing stoichiometric ratios.

When used to reinforce polymers, graphene in any form increases polymer toughness by inhibiting crack propagation. Graphene is also added to polymers and other compositions to provide electrical and thermal conductivity. The thermal conductivity of graphene makes it an ideal additive for thermal management (e.g., planar heat dissipation) for electronic devices and lasers. Some commercial applications of carbon fiber-reinforced polymer matrix composites (CF-PMCs) include aircraft and aerospace systems, automotive, electronics, government defense/security, pressure vessels, and reactor chambers, among others.

Progress in the development of low-cost methods to effectively produce graphene-reinforced polymer matrix composites (G-PMCs) remains very slow. Currently, some of the challenges that exist affecting the development of G-PMCs viable for use in real world applications are that the materials used are expensive and the presently used chemical or mechanical manipulations have not been practical for large-scale commercial production.

Thus, it would be desirable for a low-cost method to produce a G-PMC suitable for large-scale commercial production that offers many property advantages, including increased specific stiffness and strength, enhanced electrical/thermal conductivity, and retention of optical transparency.

SUMMARY OF THE INVENTION

The present disclosure provides polymer processing methods to fabricate a graphene-reinforced polymer matrix composite (G-PMC) by elongational flow and folding of well-crystallized graphite particles dispersed in a molten polymer matrix.

In one aspect, this disclosure provides a method for forming a graphene-reinforced polymer matrix composite. The method includes: distributing graphite microparticles into a molten thermoplastic polymer phase, wherein at least 50% by weight of graphite in the graphite microparticles comprises multilayer graphite crystals between 1.0 and 1000 microns thick along a c-axis direction; and applying a succession of shear strain events to the molten polymer phase so that the shear stress within the molten polymer phase is equal to or greater than the Interlayer Shear Strength (ISS) of the graphite microparticles and the molten polymer phase mechanically exfoliates the graphite successively with each event until the graphite is at least partially exfoliated to form a distribution in the molten polymer phase of essentially pure and uncontaminated single- and multi-layer graphene nanoparticles less than 50 nanometers (e.g., less than 5 nm, less than 10 nm, less than 20 nm, less than 30 nm, less than 40 nm) thick along the c-axis direction. The method may further include continuing the shear strain events until graphene fractures of the exfoliated single- and/or multi-layer graphene nanoparticles are formed across the basal plane defined by a-axis and b-axis, wherein the edges of the graphene fractures comprise reactive free radical graphenic carbon bonding sites that react with the one or more molten thermoplastic polymers to provide a composite where thermoplastic polymer chains are directly covalently bonded to, and inter-molecularly cross-linked by, the single- and/or multi-layer graphene nanoparticles.

In some embodiments, the composite comprises from about 0.01 wt % to about 90 wt % of particles selected from the group consisting of single- and multi-layer graphene nanoparticles less than 50 nanometers (e.g., less than 5 nm, less than 10 nm, less than 20 nm, less than 30 nm, less than 40 nm) thick along a c-axis direction, partially exfoliated multi-layer graphene nanoparticles from 10 to 1,000 nanometers thick along the c-axis direction, graphite microparticles, and combinations of two or more thereof, wherein from about 5 wt % to less than about 95 wt % of the particles are single- and multi-layer graphene nanoparticles less than 50 nanometers (e.g., less than 5 nm, less than 10 nm, less than 20 nm, less than 30 nm, less than 40 nm) thick along the c-axis direction.

In some embodiments, the composite comprises from about 0.01 wt % to about 60 wt % of the single- and multi-layer graphene nanoparticles. In some embodiments, the composite comprises from about 0.01 wt % to about 30 wt % of single- and multi-layer graphene nanoparticles. In some embodiments, the composite comprises from about 1 wt % to about 30 wt % of the single- and multi-layer graphene nanoparticles. In some embodiments, the composite comprises from about 1 wt % to about 10 wt % of the single- and multi-layer graphene nanoparticles.

In some embodiments, the composite comprises at least one thermoplastic polymer molecule bonded or adhered to one or more mechanically exfoliated single- or multi-layer graphene nanoparticles. In some embodiments, the composite comprises at least one single- or multi-layer graphene nanoparticle covalently bonded to one or more thermoplastic polymer molecules.

In some embodiments, the composite comprises a distribution of a plurality of graphene/polymer clusters. Each of the graphene/polymer clusters comprises at least one thermoplastic polymer molecule covalently bonded or adhered to one or more mechanically exfoliated single- or multi-layer graphene nanoparticles. In some embodiments, each of the graphene/polymer clusters comprises at least one single- or multi-layer graphene nanoparticle covalently bonded to one or more thermoplastic polymer molecules.

In some embodiments, the method includes applying a succession of shear strain events to generate a shear rate less than or equal to 1000 $sec^{-1}$ (e.g., 1000 $sec^{-1}$, 900 $sec^{-1}$, 800 $sec^{-1}$, 700 $sec^{-1}$, 600 $sec^{-1}$, 500 $sec^{-1}$, 400 $sec^{-1}$, 300 $sec^{-1}$, 200 $sec^{-1}$, 100 $sec^{-1}$, 50 $sec^{-1}$).

In some embodiments, the polymer is selected from the group consisting of acrylics, polyamide-imide (PAI), polyetherimide (PEI), polyimide (PI), aromatic thermoplastic polyester, polycarbonate (PC), Polybutadiene (PBD), polydimethylsiloxane (PDMS), polyaryletherketone (PAEK), polyethylene naphthalene dicarboxylate (PEN), polysulphone (PSU, polyphenylene sulfide (PPS), polyethylene), polyglycolic acid (PGA), polylactic acid (PLA), polylactic-glycolic acid copolymer (PLGA), polyoxymethylene plastic (POM/Acetal), polyphenylene ether (PPE or PPO), polypropylene (PP), polystyrene (PS), polytetrafluoroethylene (PTFE/TEFLON), polyvinylchloride (PVC), polyvinylidene fluoride (PVDF), thermoplastic elastomer (TPE), liquid crystal polymer, natural or synthetic rubber, polyamide (PA), and the mixtures of two or more thereof.

In some embodiments, the polyamide includes polyamide-11 (nylon-11), polyamide-12 (nylon-12), polyamide-4,6 (nylon-4,6), polyamide-6 (nylon-6), polyamide-6,10 (nylon-6,10), polyamide-6,12 (nylon-6,12), polyamide-6,6 (nylon-6,6), polyamide-6,9 (nylon-6,9).

In some embodiments, the graphite is expanded graphite. In some embodiments, the graphite is doped with other elements to modify a surface chemistry of the exfoliated graphene nanoparticles. In some embodiments, a surface chemistry or nanostructure of the dispersed graphite is modified to enhance bond strength with the polymer matrix to increase strength and stiffness of the composite.

In some embodiments, the graphene nanoparticles are directionally aligned thereby providing one-, two- or three-dimensional reinforcement of the polymer phase. In some embodiments, the composite comprises residual graphite microparticles.

In another aspect, this disclosure provides a graphene-reinforced polymer matrix composite prepared by the method as described above. The composite may include from about 0.01 wt % to about 90 wt % of particles selected from the group consisting of single- and multi-layer graphene nanoparticles less than 50 nanometers (e.g., less than 5 nm, less than 10 nm, less than 20 nm, less than 30 nm, less than 40 nm) thick along a c-axis direction, partially exfoliated multi-layer graphene nanoparticles from 10 to 1,000 nanometers thick along the c-axis direction, graphite microparticles, and combinations of two or more thereof, wherein from about 5 wt % to less than about 95 wt % of the particles are single- and multi-layer graphene nanoparticles less than 50 nanometers (e.g., less than 5 nm, less than 10 nm, less than 20 nm, less than 30 nm, less than 40 nm) thick along the c-axis direction. In some embodiments, the composite comprises from about 0.01 wt % to about 60 wt % of the single- and multi-layer graphene nanoparticles. In some embodiments, the composite comprises from about 0.01 wt % to about 30 wt % of single- and multi-layer graphene nanoparticles. In some embodiments, the composite comprises from about 1 wt % to about 30 wt % of the single- and multi-layer graphene nanoparticles. In some embodiments, the composite comprises from about 1 wt % to about 10 wt % of the single- and multi-layer graphene nanoparticles.

In yet another aspect, this disclosure provides a graphene-reinforced polymer matrix composite comprising: a distribution in a thermoplastic polymer matrix of single- and multi-layer graphene nanoparticles less than 50 nanometers (e.g., less than 5 nm, less than 10 nm, less than 20 nm, less than 30 nm, less than 40 nm) thick along a c-axis direction and graphite microparticles, wherein the composite comprises thermoplastic polymer chains inter-molecularly cross-linked by mechanically torn single- and/or multi-layer graphene nanoparticles having carbon atoms with reactive bonding sites on the torn edges of the graphene nanoparticles.

In some embodiments, the composite comprises at least one thermoplastic polymer molecule bonded or adhered to one or more mechanically exfoliated single- or multi-layer graphene nanoparticles. In some embodiments, the composite comprises at least one single- or multi-layer graphene nanoparticle covalently bonded to one or more thermoplastic polymer molecules.

In some embodiments, the composite comprises a distribution of a plurality of graphene/polymer clusters. Each of the graphene/polymer clusters comprises at least one thermoplastic polymer molecule covalently bonded or adhered to one or more mechanically exfoliated single- or multi-layer graphene nanoparticles. In some embodiments, each of the graphene/polymer clusters comprises at least one single- or multi-layer graphene nanoparticle covalently bonded to one or more thermoplastic polymer molecules.

In some embodiments, the composite may include from about 0.01 wt % to about 90 wt % of particles selected from the group consisting of single- and multi-layer graphene nanoparticles less than 10 nanometers thick along a c-axis direction, partially exfoliated multi-layer graphene nanoparticles from 10 to 1,000 nanometers thick along the c-axis direction, graphite microparticles, and combinations of two or more thereof, wherein from about 5 wt % to less than about 95 wt % of the particles are single- and multi-layer graphene nanoparticles 50 nanometers (e.g., less than 5 nm, less than 10 nm, less than 20 nm, less than 30 nm, less than 40 nm) thick along the c-axis direction. In some embodiments, the composite comprises from about 0.01 wt % to about 60 wt % of the single- and multi-layer graphene nanoparticles. In some embodiments, the composite comprises from about 0.01 wt % to about 30 wt % of single- and multi-layer graphene nanoparticles. In some embodiments, the composite comprises from about 1 wt % to about 30 wt % of the single- and multi-layer graphene nanoparticles. In some embodiments, the composite comprises from about 1 wt % to about 10 wt % of the single- and multi-layer graphene nanoparticles.

In some embodiments, the composite comprises residual graphite microparticles. In some embodiments, a surface chemistry or nanostructure of the dispersed graphite is modified to enhance bond strength with the polymer matrix to increase strength and stiffness of the composite.

The foregoing summary is not intended to define every aspect of the disclosure, and additional aspects are described in other sections, such as the following detailed description. The entire document is intended to be related as a unified disclosure, and it should be understood that all combinations of features described herein are contemplated, even if the combination of features are not found together in the same sentence, or paragraph, or section of this document. Other features and advantages of the invention will become apparent from the following detailed description. It should be understood, however, that the detailed description and the specific examples, while indicating specific embodiments of the disclosure, are given by way of illustration only, because various changes and modifications within the spirit and scope of the disclosure will become apparent to those skilled in the art from this detailed description.

BRIEF DESCRIPTION OF THE DRAWINGS

FIG. 4a shows in 1 µm scale and 50K× magnification, FIG. 4b shows in 100 µm scale and 10K× magnification, and FIG. 4c shows in 100 µm scale and 400K× magnification

DETAILED DESCRIPTION OF THE INVENTION

Figure 1:
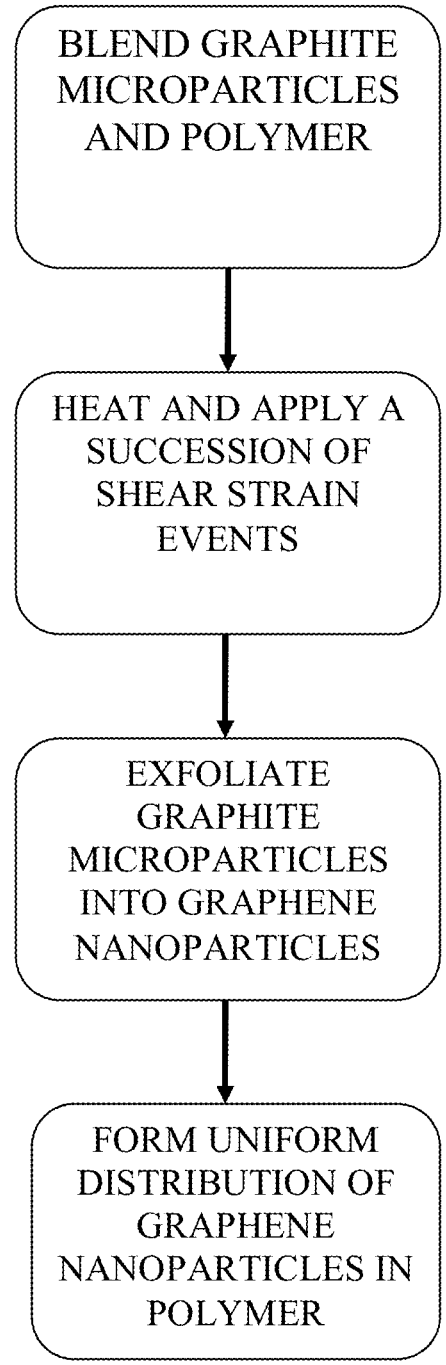
FIG. 1 is a flowchart illustrating various steps that an in situ exfoliation method of fabricating a graphene-reinforced polymer matrix composite may implement.

This disclosure provides a high-efficiency mixing method to transform a polymer composite that contains well-crystallized graphite particles into nano-dispersed single or multi-layer graphene particles. The method involves in situ exfoliation of the graphite layers by compounding in a batch mixer or extruder that impart repetitive, high shear strain rates. In both processes, longer mixing times provide enhanced exfoliation of the graphite into graphene nanoparticles within the polymer matrix composite (PMC). In addition, additives may be used to promote sufficient graphene/polymer bonding, thereby yielding a low-density graphene-reinforced polymer matrix composite (G-PMC). The method is low cost to produce a G-PMC that offers numerous property advantages, including increased specific stiffness and strength, enhanced electrical/thermal conductivity, and retention of optical transparency.

The terms "graphene" or "graphene nanoparticles" refer to the name given to a single layer of carbon atoms densely packed into a benzene-ring structure. Graphene, when used alone, may refer to single-layer graphene, few-layer graphene, multi-layer graphene, graphene flakes, and/or graphene platelets, in a pure and uncontaminated form.

Graphite, the starting material from which graphene is formed, is composed of a layered planar structure in which the carbon atoms in each layer are arranged in a hexagonal lattice. The planar layers are defined as having an "a" and a "b" axis, with a "c" axis normal to the plane defined by the "a" and "b" axes. The graphene particles produced by the inventive methods have an aspect ratio defined by the "a" or "b" axis distance divided by the "c" axis distance. Aspect ratio values for the inventive nanoparticles exceed 25:1 and typically range between 50:1 and 1000:1.

Repeated compounding during a batch mixing process or single screw extrusion is used to progressively transform the initial graphite-particle dispersion into a uniform nano-dispersion of discrete graphene nanoparticles. In some cases, an inert gas or vacuum may be used during processing. The method is described herein as "mechanical" exfoliation to distinguish it from "chemical" exfoliation, which is the primary thrust of much of today's research. An advantage of the mechanical method is that contamination-free graphene-polymer interfaces are formed during high-shear mixing, thus ensuring good interface adhesion or bonding. Other advantages of in situ exfoliation are that it avoids making and handling graphene flakes, as well as dispersing them uniformly in the polymer matrix phase.

Depending on the number of in situ shear strain events, the method provides single-layer graphene, few-layer graphene, multi-layer graphene, graphene flakes, and/or graphene platelets in a pure and uncontaminated form. Platelets have diamond-like stiffness and are used for polymer reinforcement. Graphene in any form increases polymer toughness by inhibiting crack propagation as a reinforcement for polymers. Graphene may be used as an additive to polymers and other compositions to provide electrical and thermal conductivity. The thermal conductivity of graphene makes it a desirable additive for thermal management for electronic devices and lasers.

The graphene may be produced as a graphene-polymer mixture suitable for use as-is as a G-PMC that can be pelletized by conventional means for subsequent fabrication processing. Alternatively, higher concentrations of graphite may be used at the outset to provide a graphene-polymer masterbatch in a concentrated form that can also be pelletized and then used to add graphene to polymer compositions as a reinforcing agent. As a further alternative, the graphene may be separated from the polymer, for example, by combustion or selective dissolution, to provide essentially pure particles of graphene.

In one aspect, this disclosure provides a method for forming a graphene-reinforced polymer matrix composite. The method includes: (a) distributing graphite microparticles into a molten thermoplastic polymer phase, wherein at least 50% by weight of graphite in the graphite microparticles comprises multilayer graphite crystals between 1.0 and 1000 microns thick along a c-axis direction; and (b) applying a succession of shear strain events to the molten polymer phase so that the shear stress within the molten polymer phase is equal to or greater than the Interlayer Shear Strength (ISS) of the graphite microparticles and the molten polymer phase mechanically exfoliates the graphite successively with each event until the graphite is at least partially exfoliated to form a distribution in the molten polymer phase of essentially pure and uncontaminated single- and multi-layer graphene nanoparticles less than 50 nanometers (e.g., less than 5 nm, less than 10 nm, less than 20 nm, less than 30 nm, less than 40 nm) thick along the c-axis direction.

In some embodiments, the method includes continuing the shear strain events until graphene fractures of the exfoliated single- and/or multi-layer graphene nanoparticles are formed across the basal plane defined by a-axis and b-axis, wherein the edges of the graphene fractures comprise reactive free radical graphenic carbon bonding sites that react with the one or more molten thermoplastic polymers to provide a composite where thermoplastic polymer chains are directly covalently bonded to, and inter-molecularly cross-linked by, the single- and/or multi-layer graphene nanoparticles.

In some embodiments, the method includes applying a succession of shear strain events to the molten polymer phase so that the molten polymer phase exfoliates the graphite successively with each event until at least about 1 wt % (e.g., 2 wt %, 5 wt %, 10 wt %, 25 wt %, 50 wt %, 60 wt %, 70 wt %, 80 wt %, 90 wt %, 95 wt %, 99 wt %, 99.5 wt %) of the graphite is exfoliated to form a distribution in the molten polymer phase of single- and multi-layer graphene nanoparticles less than 50 nanometers (e.g., less than 5 nm, less than 10 nm, less than 20 nm, less than 30 nm, less than 40 nm) thick along a c-axis direction.

In some embodiments, the method includes applying a succession of shear strain events to generate a shear rate less than or equal to 1000 sec$^{-1}$ (e.g., 1000 sec$^{-1}$, 900 sec$^{-1}$, 800 sec$^{-1}$, 700 sec$^{-1}$, 600 sec$^{-1}$, 500 sec$^{-1}$, 400 sec$^{-1}$, 300 sec$^{-1}$, 200 sec$^{-1}$, 100 sec$^{-1}$, 50 sec$^{-1}$, 10 sec$^{-1}$).

In some embodiments, the graphite particles may be prepared by crushing and grinding a graphite-containing mineral to millimeter-sized dimensions. The millimeter-sized particles may be reduced to micron-sized dimensions using ball milling or attritor milling. In some embodiments, the graphite particles can be extracted from the micron-sized particle mixture by a flotation method. The extracted graphite particles may be incorporated in a polymer matrix using a single screw extruder with axial fluted extensional mixing elements or spiral fluted extensional mixing elements. In some embodiments, the graphite-containing polymer matrix is subjected to repeated extrusion to induce exfoliation of the graphitic material, thus forming a uniform dispersion of graphene nanoparticles in the polymer matrix.

In some embodiments, the fractured single- or multi-layer graphene nanoparticles resulted from in situ exfoliation and polymer may form graphene nanoparticles/polymer clusters. Each mechanically exfoliated graphene nanoparticles may be bonded, preferably covalently, with one or more polymer chains. The polymer chains may, in turn, form additional covalent bonds with more newly exfoliated graphene nanoparticles. These graphene nanoparticles may form more covalent bonds with additional polymers. Similarly, each polymer chain may be bonded, preferably covalently, or adhered to one or more mechanically graphene nanoparticles. This process can lead to nanosized clusters of covalent bonded graphene nanoparticles and polymers. These clusters have similar bonding structure as a thermoset block of polymers, in which molecules are chemically bonded together.

In some embodiments, the composite comprises a distribution of a plurality of graphene/polymer clusters. Each of the graphene/polymer clusters comprises at least one thermoplastic polymer molecule covalently bonded or adhered to one or more mechanically exfoliated single- or multi-layer graphene nanoparticles. In some embodiments, each of the graphene/polymer clusters comprises at least one single- or multi-layer graphene nanoparticle covalently bonded to one or more thermoplastic polymer molecules.

Depending on the extent of cross-linking between polymer molecules and mechanically exfoliated graphene nanoparticles, the graphene-reinforced polymer matrix composite prepared by the above-described methods comprises at least one thermoplastic polymer molecule bonded or adhered to one or more mechanically exfoliated single- or multi-layer graphene nanoparticles. In some embodiments, the graphene-reinforced polymer matrix composite prepared by the above-described method comprises at least one single- or multi-layer graphene nanoparticle covalently bonded to one or more thermoplastic polymer molecules.

In some embodiments, the composite comprises up to 90 wt % (e.g., 1 part-per-million (ppm), 5 ppm, 10 ppm, 50 ppm, 0.01 wt %, 1 wt %, 5 wt %, 10 wt %, 20 wt %, 30 wt %, 40 wt %, 50 wt %, 60 wt %, 70 wt %, 80 wt %, 90 wt %) of particles selected from the group consisting of single- and multi-layer graphene nanoparticles less than 50 nanometers (e.g., less than 5 nm, less than 10 nm, less than 20 nm, less than 30 nm, less than 40 nm) thick along a c-axis direction, partially exfoliated multi-layer graphene nanoparticles from 10 to 1,000 nanometers thick along the c-axis direction, graphite microparticles, and combinations of two or more thereof, wherein from about 5 wt % to less than about 95 wt % of the particles are single- and multi-layer graphene nanoparticles less than 10 nanometers thick along the c-axis direction. In some embodiments, the composite comprises from about 0.01 wt % to about 60 wt % of the single- and multi-layer graphene nanoparticles. In some embodiments, the composite comprises from about 0.01 wt % to about 30 wt % of single- and multi-layer graphene nanoparticles. In some embodiments, the composite comprises from about 1 wt % to about 30 wt % of the single- and multi-layer graphene nanoparticles. In some embodiments, the composite comprises from about 1 wt % to about 10 wt % of the single- and multi-layer graphene nanoparticles.

Non-limiting examples of the polymer include acrylics, polyamide-imide (PAI), polyetherimide (PEI), polyimide (PI) (e.g., thermoplastic polyimide), aromatic thermoplastic polyester (e.g., polyacrylate), polycarbonate (PC), Polybutadiene (PBD), polydimethylsiloxane (PDMS), polyaryletherketone (PAEK), polyethylene naphthalene dicarboxylate (PEN), polysulphone (PSU, polyphenylene sulfide (PPS), polyethylene), polyglycolic acid (PGA), polylactic acid (PLA), polylactic-glycolic acid copolymer (PLGA), polyoxymethylene plastic (POM/Acetal), polyphenylene ether (PPE or PPO), polypropylene (PP), polystyrene (PS), polytetrafluoroethylene (PTFE/TEFLON), polyvinylchloride (PVC), polyvinylidene fluoride (PVDF), thermoplastic elastomer (TPE), liquid crystal polymer, natural or synthetic rubber, polyamide (PA), and the mixtures of two or more thereof.

Acrylics may include polymethyl-methacrylate (PMMA), acrylonitrile (e.g., acrylonitrile butadiene styrene (ABS) copolymer, polyacrylonitrile (PAN)). Polyaryletherketone (PAEK) may include polyetheretherketone (PEEK) and polyetherketone (PEK). Polysulphone (PSU) may include aromatic polysulfone, polyethersulfone (PES), and poly (arylene sulfone) (PAS). Polyethylene may include polyethylene terephthalate (PET or PETE), low-density polyethylene (LDPE), high-density polyethylene (HDPE), and ultra-high-molecular-weight polyethylene (UHMWPE)). Polyamide (PA) may include aliphatic polyamide, aromatic polyamide, semi-aromatic polyamide. Polyamide (PA) may also include nylons, such as polyamide-11 (nylon-11), polyamide-12 (nylon-12), polyamide-4,6, polyamide-6 (nylon-6), polyamide-6,10, polyamide-6,12, polyamide-6,6 (nylon-6,6), polyamide-6,9.

Nylons are a well-known class of aliphatic polyamide derived from aliphatic diamines and aliphatic diacids. Alternatively, other polyamides also classed as nylons are derived from ring-opening polymerization of a lactam, such as nylon-6 (PA-6, polycaprolactam), derived from caprolactam. In some embodiments, the aliphatic polyamide is polyamide-6,6, which is derived from hexamethylenediamine and adipic acid. Semi-aromatic polyamides contain a mixture of aliphatic and aromatic moieties and can be derived, for example, from an aliphatic diamine and an aromatic diacid. The semi-aromatic polyamide can be a polyphthalamide such as PA-6T, which is derived from hexamethylenediamine and terephthalic acid. Aromatic polyamides, also known as aramids, contain aromatic moieties and can be derived, for example, from an aromatic diamine and an aromatic diacid. The aromatic polyamide can be a para-aramid such as those derived from para-phenylenediamine and terephthalic acid. A representative of the latter includes KEVLAR.

In some embodiments, the thermoplastic polymer is an aromatic polymer. As defined herein the term "aromatic polymer" refers to a polymer comprising aromatic moieties, either as part of the polymer backbone or as substituents attached to the polymer backbone, optionally via a linker. Linkers include linear or branched alkylene groups, such as methylene, ethylene, and propylene, linear or branched heteroalkylene groups, such as —OCH$_2$—, —CH$_2$O—, —OCH$_2$CH$_2$—, —CH$_2$CH$_2$O—, —OCH$_2$CH$_2$CH$_2$—, —CH$_2$OCH$_2$—, —OCH(CH$_3$)—, —SCH$_2$—, —CH$_2$S—, —NRCH$_2$—, —CH$_2$NR—, and the like, where the heteroatom is selected from the groups consisting of oxygen, nitrogen, and sulfur, and R is selected from hydrogen and lower alkyl. Linkers can also be heteroatomic, such as —O—, —NR— and —S—. When the linkers contain sulfur, the sulfur atom is optionally oxidized. The aromatic moieties are selected from monocyclic, e.g., phenyl, and polycyclic moieties, e.g., indole naphthyl, anthracene, etc., and are optionally substituted with amino, NHR, NR$_2$, halogen, nitro, cyano, alkylthio, alkoxy, alkyl, haloalkyl, CO$_2$R where R is defined as above, and combinations of two or more thereof. The aromatic moieties can also be heteroaryl, comprising one to three heteroatoms selected from the group consisting of oxygen, nitrogen, and sulfur, and optionally substituted as described above. The aromatic polymer preferably comprises phenyl groups, optionally substituted as disclosed above, either as part of the polymer backbone or as substituents on the backbone, the latter optionally through a linker, as disclosed above. In some embodiments, the optionally substituted phenyl groups are contained within the polymer backbone as optionally substituted phenylene groups. In some embodiments, the optionally substituted phenyl groups are substituents on the polymer backbone, optionally connected through a linker, as described above.

In some embodiments, the graphite is expanded graphite. In some embodiments, the graphite is doped with other elements to modify a surface chemistry of the exfoliated graphene nanoparticles. A surface chemistry or nanostructure of the dispersed graphite is modified to enhance bond strength with the polymer matrix to increase strength and stiffness of the graphene composite. In some embodiments, the graphene nanoparticles are directionally aligned thereby providing one-, two- or three-dimensional reinforcement of the polymer matrix phase. In some embodiments, the composite comprises residual graphite microparticles. For example, the composite may comprise between about 10 ppm and about 10 wt %, between about 5 ppm and about 10 wt %, between about 1 ppm and about 10 wt %, between about 0.001 wt % and about 10 wt %, between about 0.01 wt % and about 10 wt %, between about 0.1 wt % and about 10 wt %, between about 1 wt % and about 10 wt %, between about 10 ppm and about 1 wt %, between about 5 ppm and about 1 wt %, between about 1 ppm and about 1 wt %, between about 0.001 wt % and about 1 wt %, between about 0.01 wt % and about 1 wt %, between about 0.1 wt % and about 1 wt %.

In yet another aspect, this disclosure provides a graphene-reinforced polymer matrix composite comprising: a distribution in a thermoplastic polymer matrix of single- and multi-layer graphene nanoparticles less than 50 nanometers (e.g., 10 nm, 20 nm, 30 nm, 40 nm, 50 nm) thick along a c-axis direction and graphite microparticles, wherein composite comprises thermoplastic polymer chains inter-molecularly cross-linked by mechanically torn single- and/or multi-layer graphene nanoparticles having carbon atoms with reactive bonding sites on the torn edges of the graphene nanoparticles. In some embodiments, the composite comprises at least one thermoplastic polymer molecule bonded or adhered to one or more mechanically exfoliated single- or multi-layer graphene nanoparticles. In some embodiments, the composite comprises at least one single- or multi-layer graphene nanoparticle covalently bonded to one or more thermoplastic polymer molecules.

In some embodiments, the composite may include up to 90 wt % (e.g., 1 ppm, 5 ppm, 10 ppm, 50 ppm, 0.01 wt %, 1 wt %, 5 wt %, 10 wt %, 20 wt %, 30 wt %, 40 wt %, 50 wt %, 60 wt %, 70 wt %, 80 wt %, 90 wt %) of particles selected from the group consisting of single- and multi-layer graphene nanoparticles less than 50 nanometers (e.g., 10 nm, 20 nm, 30 nm, 40 nm, 50 nm) thick along a c-axis direction, partially exfoliated multi-layer graphene nanoparticles from 10 to 1,000 nanometers thick along the c-axis direction, graphite microparticles, and combinations of two or more thereof, wherein from about 5 wt % to less than about 95 wt % of the particles are single- and multi-layer graphene nanoparticles less than 10 nanometers (e.g., 10 nm, 20 nm, 30 nm, 40 nm, 50 nm) thick along the c-axis direction. In some embodiments, graphene is essentially pure and uncontaminated.

In some embodiments, the composite comprises from about 0.01 wt % to about 60 wt % of the single- and multi-layer graphene nanoparticles. In some embodiments, the composite comprises from about 0.01 wt % to about 30 wt % of single- and multi-layer graphene nanoparticles. In some embodiments, the composite comprises from about 1 wt % to about 30 wt % of the single- and multi-layer graphene nanoparticles. In some embodiments, the composite comprises from about 1 wt % to about 10 wt % of the single- and multi-layer graphene nanoparticles.

Similarly, the graphene-reinforced polymers matrix composite masterbatches may include up to 90 wt % (e.g., 1 ppm, 5 ppm, 10 ppm, 50 ppm, 0.01 wt %, 1 wt %, 5 wt %, 10 wt %, 20 wt %, 30 wt %, 40 wt %, 50 wt %, 60 wt %, 70 wt %, 80 wt %, 90 wt %) of particles selected from the group consisting of single- and multi-layer graphene nanoparticles less than 50 nanometers (e.g., 10 nm, 20 nm, 30 nm, 40 nm, 50 nm) thick along a c-axis direction, partially exfoliated multi-layer graphene nanoparticles from 10 to 1,000 nanometers thick along the c-axis direction, graphite microparticles, and combinations of two or more thereof.

The availability of graphite-rich mineral deposits, containing relatively high concentrations (e.g., about 20 wt %) of well-crystallized graphite, makes for a low cost and virtually inexhaustible source of raw material. As discussed below, the extraction of graphite particles from mined material can be accomplished in a cost-effective manner. Synthetic graphite of high purity and exceptional crystallinity (e.g., pyrolytic graphite) may also be used for the same purpose. However, in this case, the batch mixing or extrusion compounding-induced exfoliation process creates a laminated composite, in which the graphene nanoparticles are oriented over a relatively large area. Such laminated composites may be preferred for specific applications.

Mechanical exfoliation of graphite within a polymer matrix may be accomplished by a polymer processing technique that imparts repetitive high shear strain events to mechanically exfoliate graphite microparticles into multi- or single-layer graphene nanoparticles within the polymer matrix.

For purposes of the present invention, graphite microparticles are defined as graphite in which at least 50 wt % of the graphite consists of multilayer graphite crystals ranging between 1.0 and 1000 microns thick along the c-axis of the lattice structure. Typically 75 wt % of the graphite consists of crystals ranging between 100 and 750 microns thick. Expanded graphite may also be used. Expanded graphite is made by forcing the crystal lattice planes apart in natural flake graphite, thus expanding the graphite, for example, by immersing flake graphite in an acid bath of chromic acid, then concentrated sulfuric acid. Expanded graphite suitable for use in this disclosure includes expanded graphite with opened edges at the bilayer level, such as MESOGRAF.

A succession of shear strain events is defined as subjecting the molten polymer to an alternating series of higher and lower shear strain rates over essentially the same time intervals so that a pulsating series of higher and lower shear forces associated with the shear strain rate are applied to the graphite particles in the molten polymer. Higher and lower shear strain rates are defined as a first, higher, shear strain rate that is at least twice the magnitude of a second, lower shear strain rate. The first shear strain rate will range between 100 and 10,000 sec$^{-1}$. At least 1,000 to over 10,000,000 alternating pulses of higher and lower shear strain pulses are applied to the molten polymer to form the exfoliated graphene nanoparticles. The number of alternating pulses required to exfoliate graphite particles into graphene particles may be dependent on the original graphite particle dimensions at the beginning of this process, i.e., smaller original graphite particles may need a fewer number of alternating pulses to achieve graphene than larger original graphite particles. This can be readily determined by one of ordinary skill in the art guided by the present specification without undue experimentation.

After high-shear mixing, the graphene flakes in the molten polymer are uniformly dispersed, randomly oriented, and have a high aspect ratio. Orientation of the graphene may be achieved by many different methods. Conventional drawing, rolling, and extrusion methods may be used to directionally align the graphene within the PMC fiber, filament, ribbon, sheet, or any other long-aspect shape. The method to fabricate and characterize a G-PMC is comprised of four main steps and is further described below:

Extraction of crystalline graphite particles from a mineral source;

Incorporation of the extracted graphite particles into a polymer matrix phase and conversion of the graphite-containing polymer into a graphene-reinforced polymer matrix composite (G-PMC) by a high-efficiency mixing/exfoliation process;

Morphology analysis to determine the extent of mechanical exfoliation and distribution of multi-layer graphene and graphene nanoparticles; and X-ray diffraction analysis to determine multi-layer graphene or graphene crystal size as a function of mechanical exfoliation.

Highly crystalline graphite may be extracted from graphite ore by a multi-step process, as described below.

Crushing: A drilled rod of graphite ore from the mine may be placed in a vice and crushed.

Grinding: The crushed graphite ore may be then ground by mortar and pestle.

Size Reduction: The ground graphite ore may be placed in a sieve with a 1 mm mesh size and size reduced. Larger pieces that do not pass through the screen may be ground by mortar and pestle and then size reduced through the 1 mm mesh size again. Eventually, all of the material passed through the 1 mm mesh size to obtain graphite ore powder.

Density Separation by Water: The 1 mm sized powder may be placed in a column filled with water and agitated until a clear separation formed between the more dense portions of the solids and the less dense portions. Graphite is near the density of water (1 g/cm$^3$), while silicon is much more dense (2.33 g/cm$^3$). The uppermost materials are siphoned off with the water and then dried. The dried powder graphite is referred to as Separated Mineral Graphite (SMG).

In commercial practice, very large crushing and grinding machines are available to produce tonnage quantities of mixed powders, from which the graphite component can be separated by standard floatation methods.

Referring now to FIG. 1, a method according to the present disclosure is depicted in a flow chart illustrating the various steps that an in situ exfoliation method of fabricating a G-PMC may implement. In this method, a polymer that is uniformly blended with micron-sized crystalline graphite particles (or graphite microparticles) is subjected to repeated compounding-element processing during batch mixing or extrusion at a temperature where the polymer adheres to the graphite particles.

The present method is suitable for a wide weight percent (wt %) range of graphite to be distributed/disperse into the polymer matrix. For example, between about 1 part per million (ppm) and about 65 wt % of graphite (graphite: (polymer+composite) (w/w)), e.g., between about 10 ppm and about 60 wt %, between about 1 ppm and about 60 wt %, between about 0.001 wt % and about 60 wt %, between about 0.01 wt % and about 60 wt %, between about 0.1 wt % and about 60 wt %, between about 1 wt % and about 60 wt %, between about 10 wt % and about 50 wt %, between about 0.1 wt % and about 50 wt %, between about 0.1 wt % and about 40 wt %, between about 0.1 wt % and about 30 wt %, between about 0.1 wt % and about 20 wt %, between about 0.1 wt % and about 10 wt %, between about 1 wt % and about 50 wt %, between about 10 wt % and about 50 wt %, between about 1 wt % and about 40 wt %, between about 1 wt % and about 30 wt %, between about 1 wt % and about 20 wt %, between about 1 wt % and about 10 wt % can be utilized for producing the graphene-reinforced polymer matrix composite.

Typical polymers have a heat viscosity (without graphite) greater than 100 cps at the compounding temperature. The compounding temperature will vary with the polymer and can range between room temperature (for polymers that are molten at room temperature) and 600° C. Typical compounding temperatures will range between 180° C. and 400° C.

In one embodiment, the extrusion compounding elements are as described in U.S. Pat. No. 6,962,431, the disclosure of which is incorporated herein by reference, with compounding sections, known as axial fluted extensional mixing elements or spiral fluted extensional mixing elements. The compounding sections act to elongate the flow of the polymer and graphite, followed by repeated folding and stretching of the material. This results in superior distributive mixing, which in turn, causes progressive exfoliation of the graphite particles into discrete graphene nanoparticles. Batch mixers may also be equipped with equivalent mixing elements.

Thus, the effect of each compounding pass is to shear-off graphene layers one after the other, such that the original graphite particles are gradually transformed into a very large number of graphene nanoparticles. After an appropriate number of such passes, the final result is a uniform dispersion of discrete graphene nanoparticles in the polymer matrix phase. Longer mixing times or a larger number of passes through the compounding elements provide smaller graphite crystal size and enhanced exfoliation of graphite into graphene nanoparticles within the polymer matrix, however, the shear events should not be of a duration that would degrade the polymer.

As the density of graphene nanoparticles increases during multi-pass extrusion, the viscosity of the polymer matrix increases, due to the influence of the growing number of polymer/graphene interfaces. To ensure continued refinement of the composite structure, the extrusion parameters are adjusted to compensate for the higher viscosity of the composite.

Automated extrusion systems are available to subject the composite material to as many passes as desired, with mixing elements as described in U.S. Pat. No. 6,962,431, and equipped with a re-circulating stream to direct flow back to the extruder input. Since processing of the graphene-reinforced PMC is direct and involves no handling of graphene particles, fabrication costs are low.

In order to mechanically exfoliate graphite into multi-layer graphene and/or graphene, the shear strain rate generated in the polymer during processing must cause a shear stress in the graphite particles greater than the critical stress required to separate two layers of graphite, or the interlayer shear strength (ISS). The shear strain rate within the polymer is controlled by the type of polymer and the processing parameters, including the geometry of the mixer, processing temperature, and revolutions per minute (RPM).

The required processing temperature and RPM for a particular polymer is determinable from polymer rheology data given that, at a constant temperature, the shear strain rate ($\dot{\gamma}$) is linearly dependent upon RPM, as in Equation 1. The geometry of the mixer appears as the rotor radius, r, and the space between the rotor and the barrel, $\Delta r$.

$$\dot{\gamma} = \left(\frac{2\pi r}{\Delta r}\right)\left(\frac{RPM}{60}\right) \quad \text{Equation 1}$$

Figure 2:
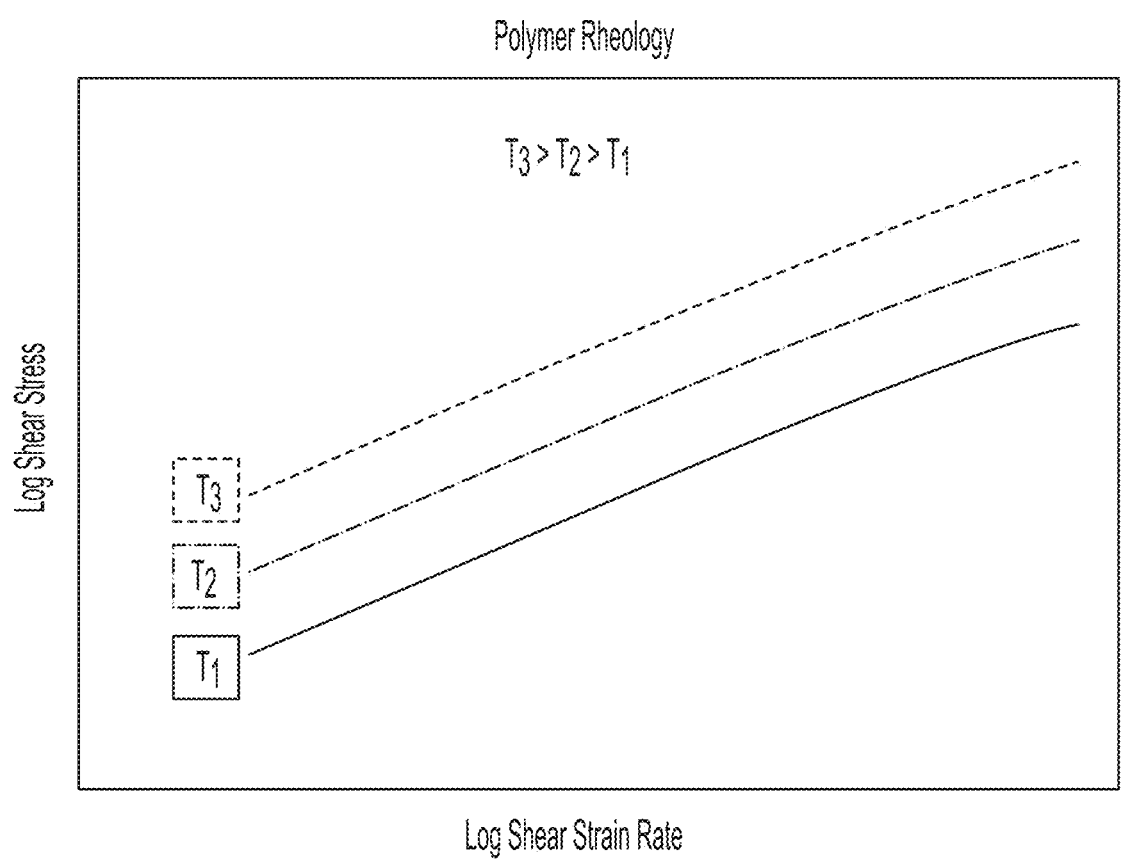
FIG. 2 is a graph illustrating the log shear stress versus the log shear strain rate collected for a polymer at three different constant temperatures.
Figure 3A:
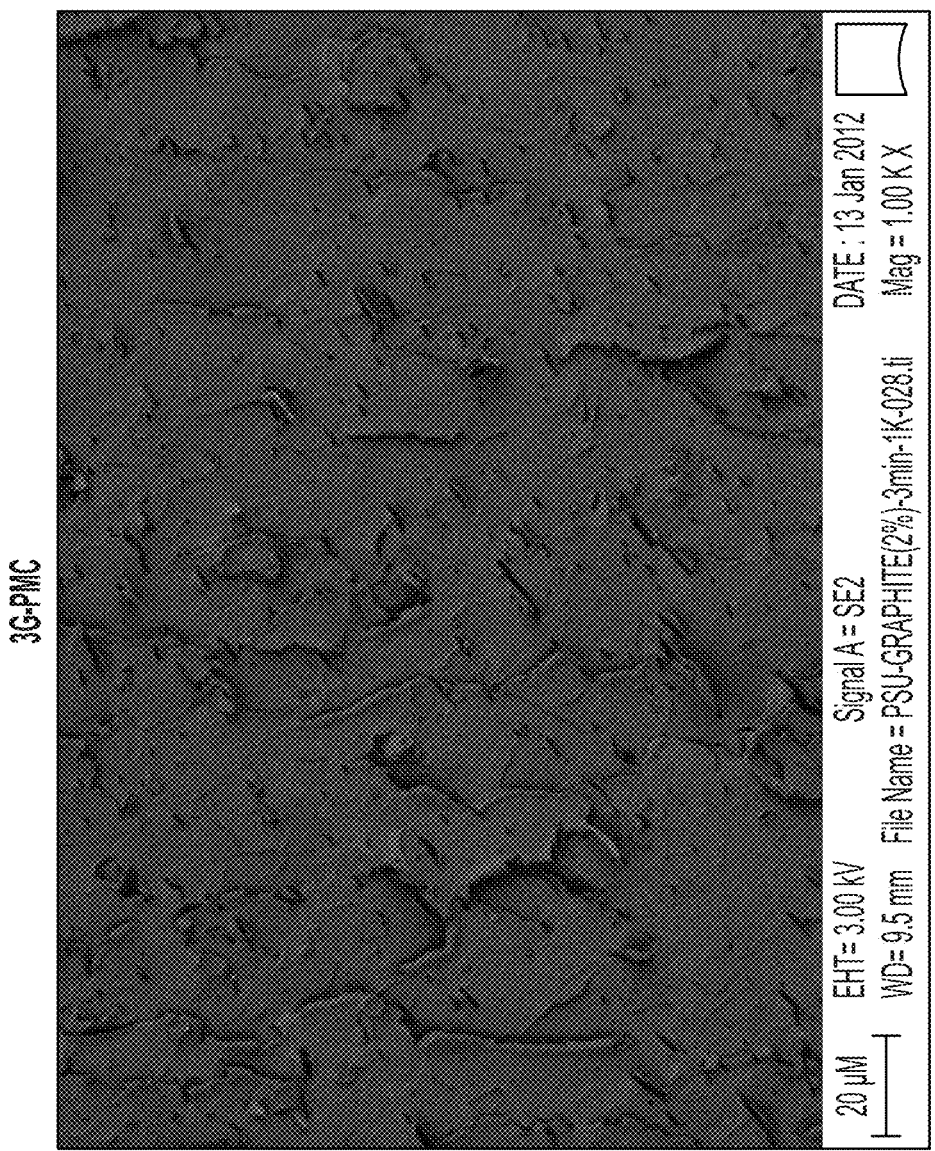
FIGS. 3a, 3b, 3c, 3d, 3e, 3f, 3g, 3h, and 3i (collectively "FIG. 3") illustrate the morphology analysis of 2% graphite exfoliated in polysulfone at mixing times of 3 minutes shown in 20 µm scale and 1K× magnification (FIG. 3a), in 1 µm scale and 10K× magnification (FIG. 3d), and in 1 µm scale and 50K× magnification (FIG. 3g); 30 minutes in 10 µm scale and 1K× magnification (FIG. 3b), in 1 µm scale and 10K× magnification (FIG. 3e), in 1 µm scale and 50K× magnification (FIG. 3h); and 90 minutes in 10 µm scale and 1K× magnification (FIG. 3c), in 1 µm scale and 10K× magnification (FIG. 3O, in 1 µm scale and 50K× magnification (FIG. 3i), according to an in situ exfoliation method of the present disclosure.
Figure 3B:
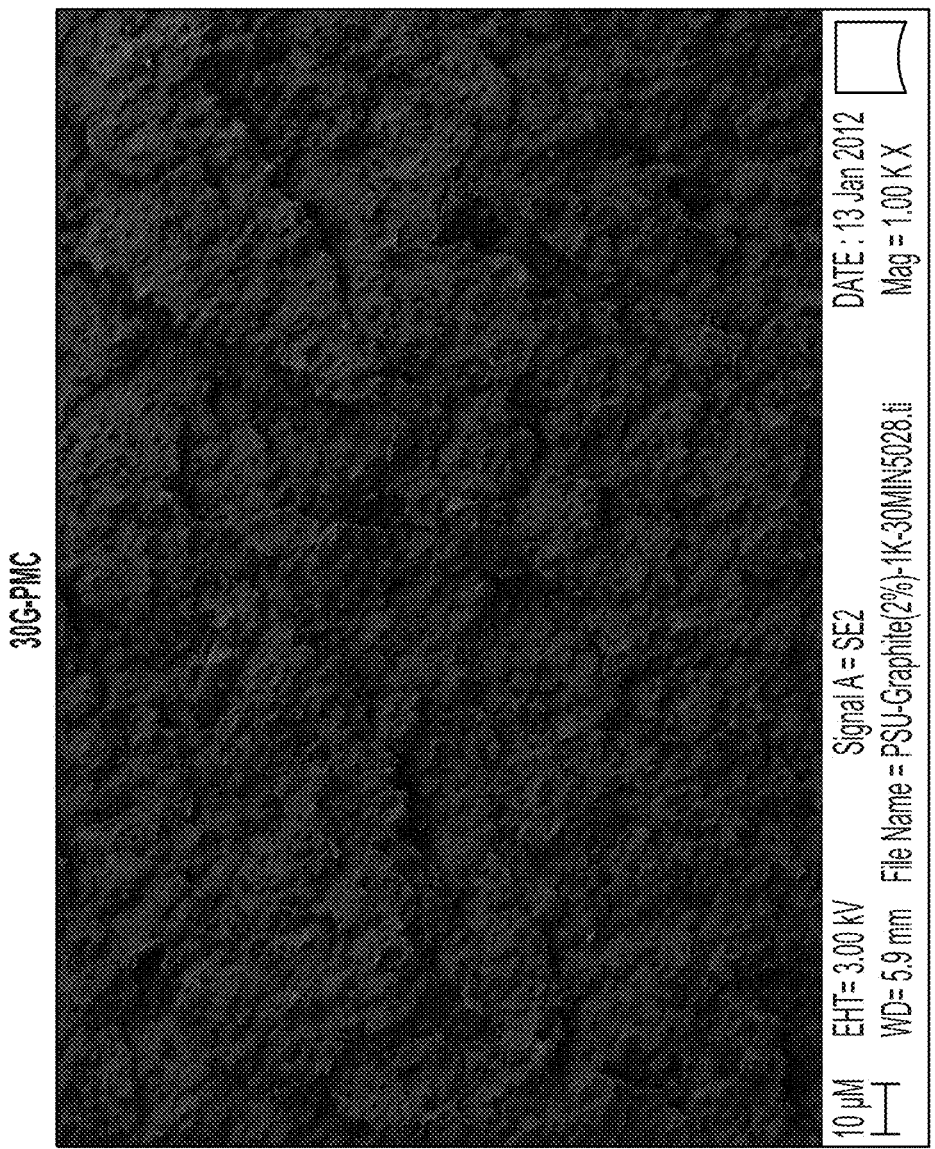
Figure 3C:
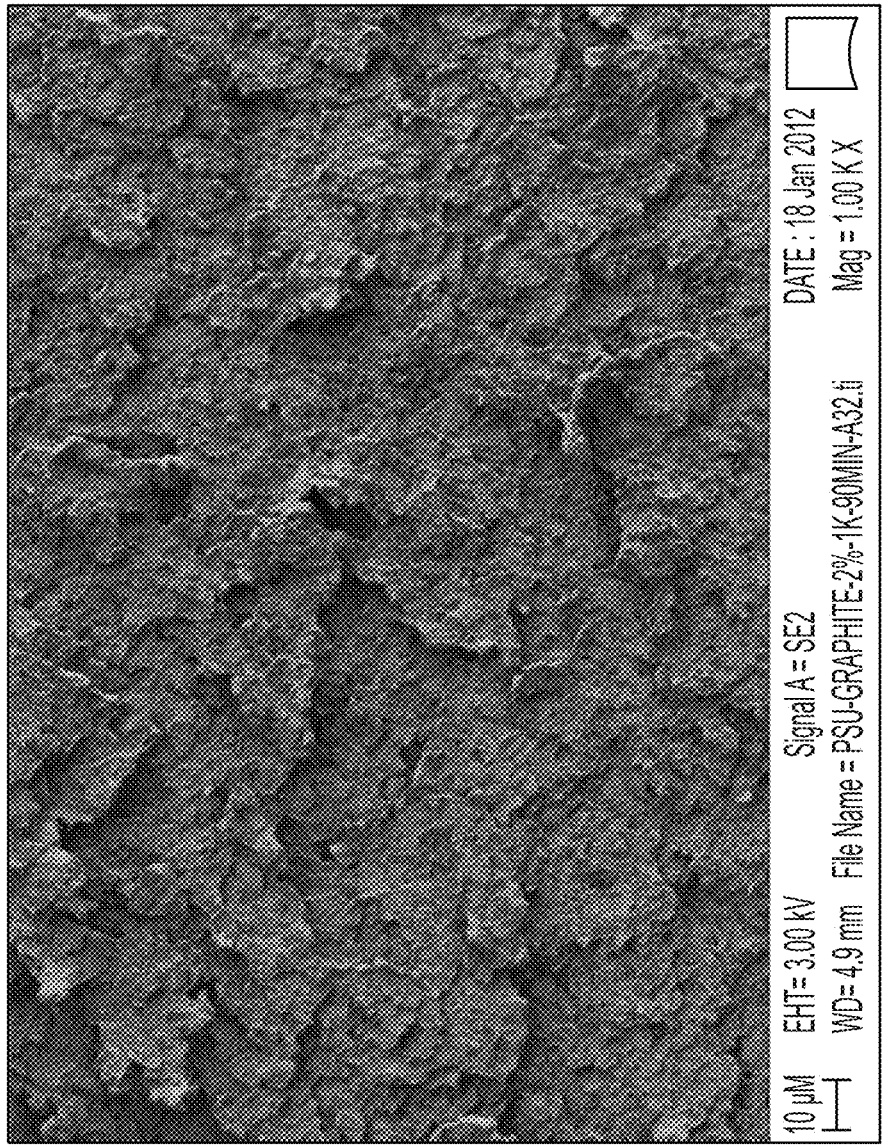
Figure 3D:
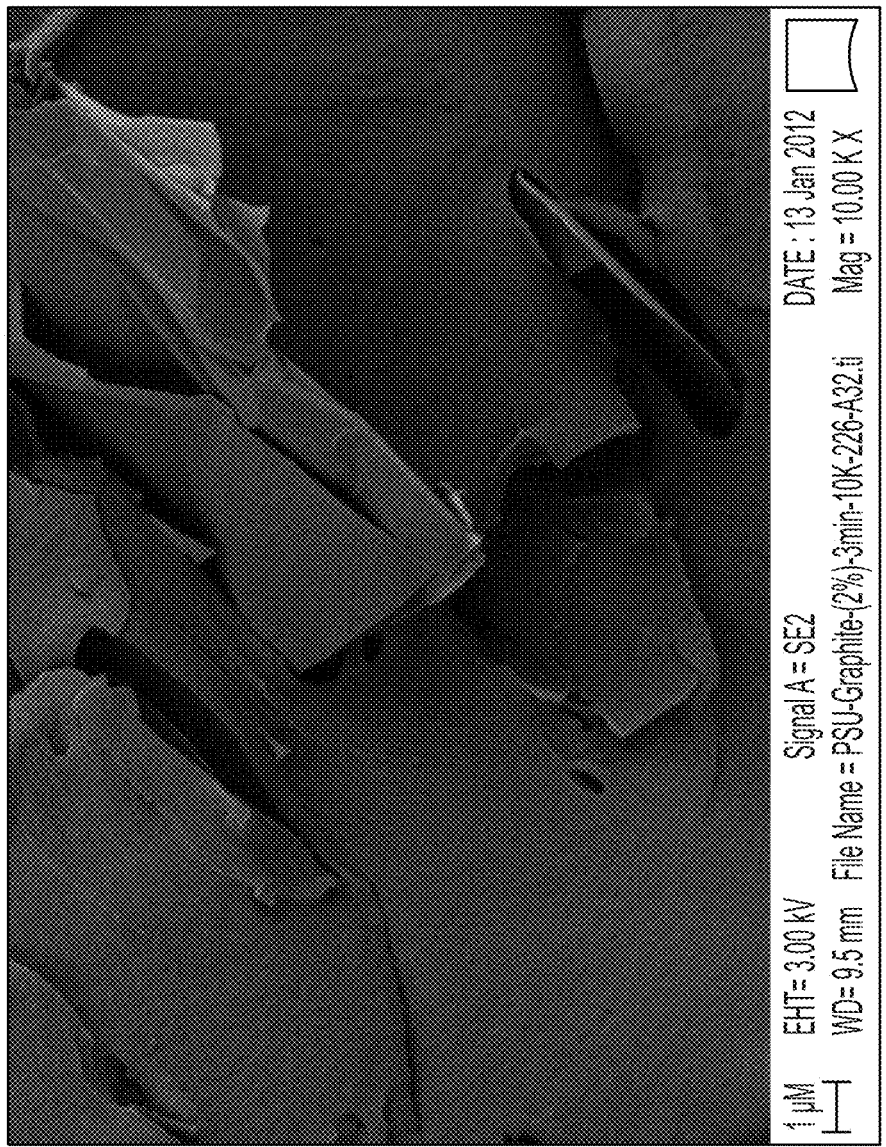
Figure 3E:
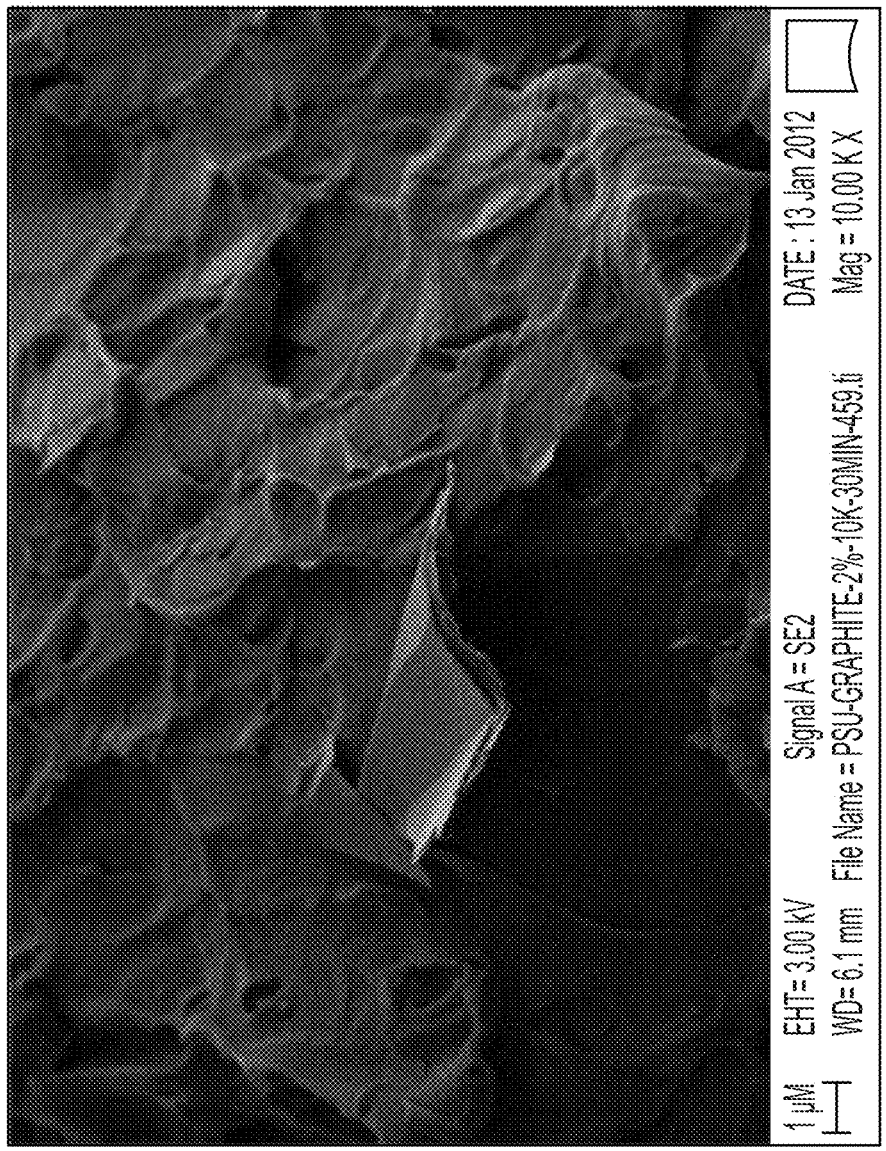
Figure 3F:
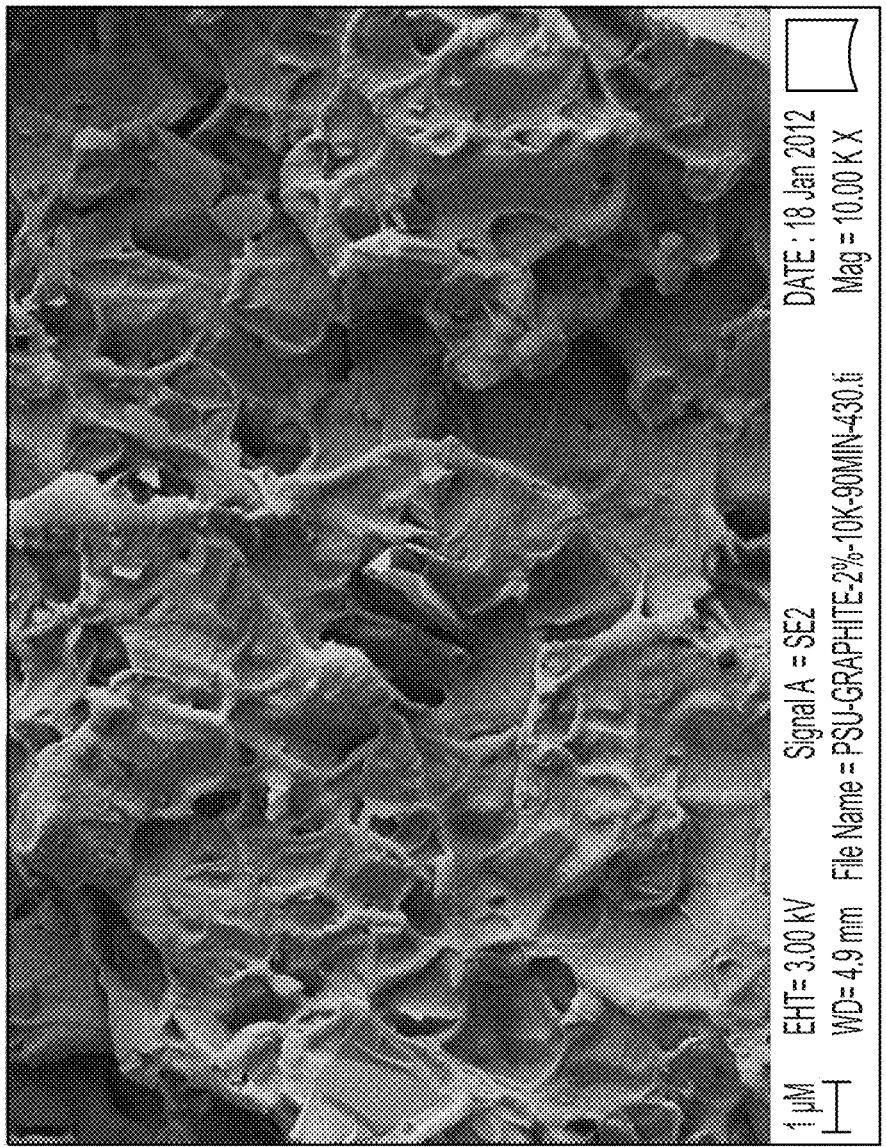
Figure 3G:
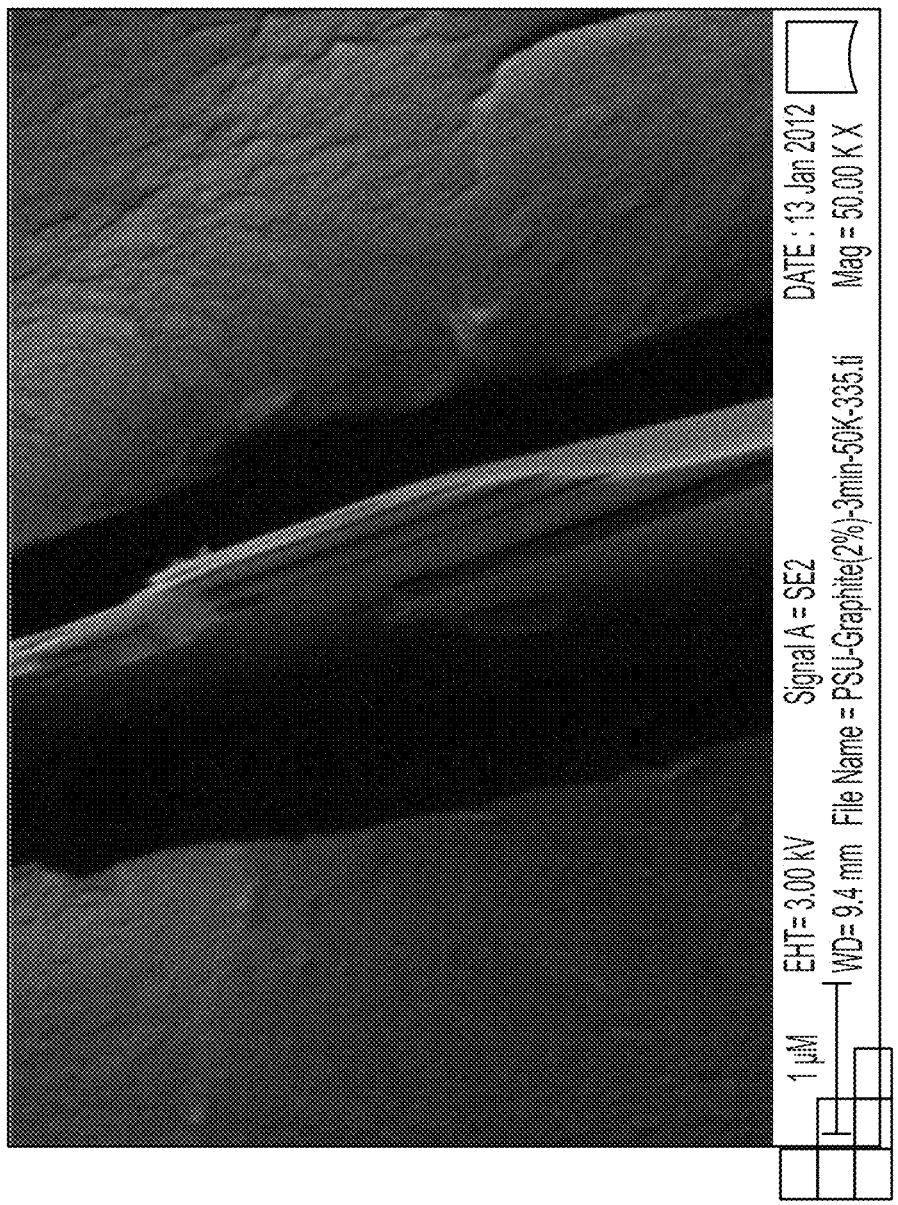
Figure 3H:
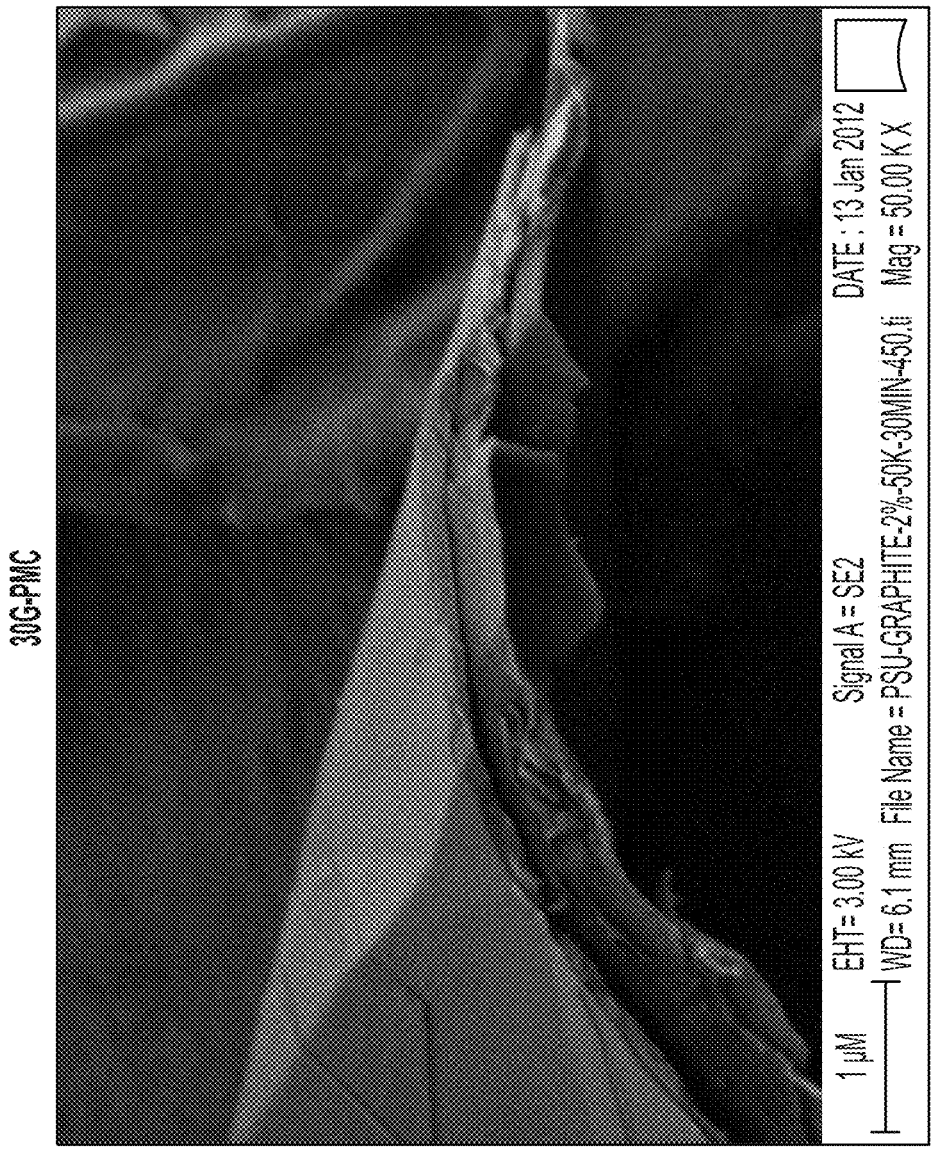
Figure 3I:
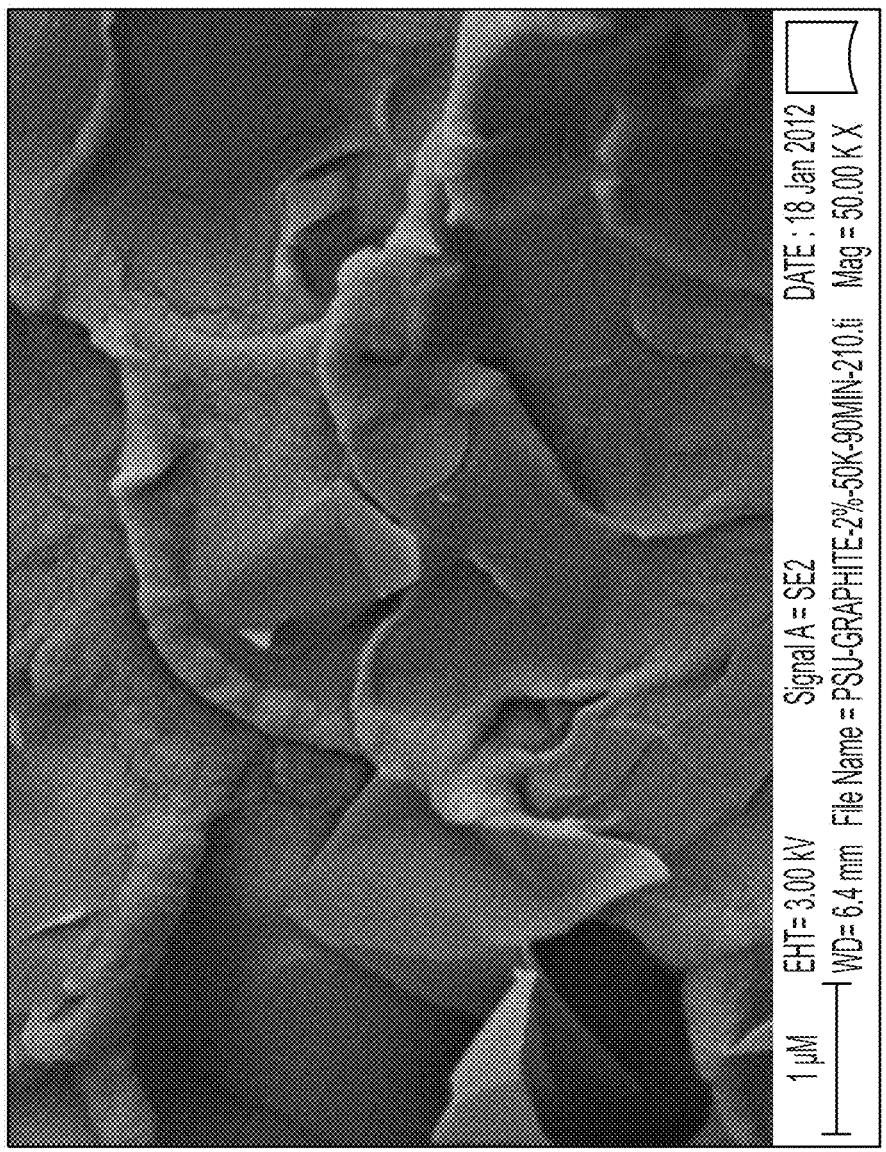

Polymer rheology data collected for a particular polymer at three different temperatures provides a log shear stress versus log shear strain rate graph, as illustrated in FIG. 2. The ISS of graphite ranges between 0.2 MPa-7 GPa, but a new method has quantified the ISS at 0.14 GPa. Thus, to mechanically exfoliate graphite in a polymer matrix during processing, the required processing temperature, shear strain rate, and RPM is determinable for a particular polymer from FIG. 2 so that the shear stress within the polymer is equal to or greater than the ISS of graphite. Under typical processing conditions, polymers have sufficient surface energy to behave like the sticky side of a scotch tape, and thus are able to share the shear stress between the polymer melt and the graphite particles.

A cross-linked G-PMC can be formed by the disclosed methods which include distributing graphite microparticles into a molten thermoplastic polymer phase comprising one or more molten thermoplastic polymers. A succession of shear strain events, as illustrated in the examples, is then applied to the molten polymer phase so that the molten polymer phase exfoliates the graphene successively with each event until a lower level of graphene layer thickness is achieved, after which point ripping and tearing of exfoliated multilayer graphene sheets occurs and produces reactive edges on the multilayer sheets that react with and cross-link the thermoplastic polymer.

Thus, activated graphene is formed as the graphene fractures across the basal plane defined by a-axis and b-axis and offers potential sites for cross-linking to the matrix or attaching other chemically unstable groups for functionalization. Therefore, the cross-linking is performed under exclusion of oxygen, preferably under an inert atmosphere or a vacuum, so that the reactive edges do not oxidize or otherwise become unreactive. Forming covalent bonds between graphene and the matrix significantly increases the composite strength. Polymers that cross-link when subjected to the method of the present invention include polymers subject to degradation by ultraviolet (UV) light. This includes polymers containing aromatic, e.g., benzene rings, such as polystyrene, polymers containing tertiary carbons, such as polypropylene and the like, polymers containing backbone oxygens, such as polyalkylene oxides, and the like.

The cross-linked G-PMC can be ground into particles and blended with non-cross-linked host polymers to serve as toughening agents for the host polymer. The non-cross-linked polymer acquires the properties of the cross-linked polymer because of chain entanglement between the two polymer species. The present invention therefore also includes cross-linked polymers of the present invention in a particulate form that can be blended with other polymers to form a high strength composite. In one embodiment cross-linked polystyrene and polymethyl methacrylate (PMMA) particles of the present invention can be used as toughening agents for host polymers. Compositions according to the present invention include host thermos-plastic polymers toughened with between about 1 wt % and about 75 wt % of the cross-linked polymer particles of the present invention. In one embodiment, the host polymers are toughened with between about 10 wt % and about 50 wt % of the cross-linked polymer particles.

In some embodiments, the disclosed graphene-reinforced polymer matrix composite has very high specific strength properties and is suitable for automotive, aviation, nautical and aerospace uses. Accordingly, this disclosure also includes automotive, aircraft, watercraft and aerospace parts fabricated from the disclosed graphene-reinforce polymer matrix, such as the cross-linked polyamide of the present invention, which can replace heavier metal parts without loss of mechanical or high-temperature properties. For example, cross-linked polyamide can be used in engine components such as pistons, valves, cam shafts, turbochargers and the like because of its high melting point and creep resistance. Forming the rotating portions of the turbine and compressor parts of a turbocharger, including the respective blades, from the cross-linked polyamide of the present invention will reduce turbocharger lag because of the resulting weight reduction. Other advantages are obtained by forming the rotating portions of the turbine and compressor of jet engines from a cross-linked polyamide of the present invention.

In some embodiments, the above graphene-reinforced polymer matrix composite further comprises at least one additive selected from fillers, dyes, pigments, mold release agents, processing aids, carbon fiber, compounds that improve electrical conductivity, and compounds that improve thermal conductivity.

DEFINITIONS

To aid in understanding the detailed description of the compositions and methods according to the disclosure, a few express definitions are provided to facilitate an unambiguous disclosure of the various aspects of the disclosure. Unless otherwise defined, all technical and scientific terms used herein have the same meaning as commonly understood by one of ordinary skill in the art to which this disclosure belongs.

The word "substantially" does not exclude "completely," e.g., a composition which is "substantially free" from Y may be completely free from Y. Where necessary, the word "substantially" may be omitted from the definition of the invention.

As used herein, the term "approximately" or "about," as applied to one or more values of interest, refers to a value that is similar to a stated reference value. In some embodiments, the term "approximately" or "about" refers to a range of values that fall within 25%, 20%, 19%, 18%, 17%, 16%, 15%, 14%, 13%, 12%, 11%, 10%, 9%, 8%, 7%, 6%, 5%, 4%, 3%, 2%, 1%, or less in either direction (greater than or less than) of the stated reference value unless otherwise stated or otherwise evident from the context (except where such number would exceed 100% of a possible value). Unless indicated otherwise herein, the term "about" is intended to include values, e.g., weight percents, proximate to the recited range that are equivalent in terms of the functionality of the individual ingredient, the composition, or the embodiment.

It is noted here that, as used in this specification and the appended claims, the singular forms "a," "an," and "the" include plural reference unless the context clearly dictates otherwise. The terms "including," "comprising," "containing," or "having" and variations thereof are meant to encompass the items listed thereafter and equivalents thereof as well as additional subject matter unless otherwise noted.

The phrases "in one embodiment," "in various embodiments," "in some embodiments," and the like are used repeatedly. Such phrases do not necessarily refer to the same embodiment, but they may unless the context dictates otherwise.

The terms "and/or" or "/" means any one of the items, any combination of the items, or all of the items with which this term is associated.

As used herein, the term "each," when used in reference to a collection of items, is intended to identify an individual item in the collection but does not necessarily refer to every item in the collection. Exceptions can occur if explicit disclosure or context clearly dictates otherwise.

The use of any and all examples, or exemplary language (e.g., "such as") provided herein, is intended merely to better illuminate the invention and does not pose a limitation on the scope of the invention unless otherwise claimed. No language in the specification should be construed as indicating any non-claimed element as essential to the practice of the invention.

All methods described herein are performed in any suitable order unless otherwise indicated herein or otherwise clearly contradicted by context. In regard to any of the methods provided, the steps of the method may occur simultaneously or sequentially. When the steps of the method occur sequentially, the steps may occur in any order, unless noted otherwise.

In cases in which a method comprises a combination of steps, each and every combination or sub-combination of the steps is encompassed within the scope of the disclosure, unless otherwise noted herein.

The section headings as used herein are for organizational purposes only and are not to be construed as limiting the subject matter described.

Each publication, patent application, patent, and other reference cited herein is incorporated by reference in its entirety to the extent that it is not inconsistent with the present disclosure. Publications disclosed herein are provided solely for their disclosure prior to the filing date of the present invention. Nothing herein is to be construed as an admission that the present invention is not entitled to antedate such publication by virtue of prior invention. Further, the dates of publication provided may be different from the actual publication dates which may need to be independently confirmed.

It is understood that the examples and embodiments described herein are for illustrative purposes only and that various modifications or changes in light thereof will be suggested to persons skilled in the art and are to be included within the spirit and purview of this application and scope of the appended claims.

EXAMPLES

The present invention is further illustrated by the following example, which should not be construed as limiting in any way. While some embodiments have been illustrated and described, it should be understood that changes and modifications can be made therein in accordance with ordinary skill in the art without departing from the invention in its broader aspects as defined in the following claims.

In one embodiment, a small scale extension mixer with a 10-gram capacity was used to compound 2% of SMG with Udel P-1700 Polysulfone (PSU) at 332° C. (630° F.) and under vacuum for 3, 30, and 90 minutes. The method is described below. Samples collected for characterization after each length of time are referred to as 3G-PMC, 30G-PMC, 90G-PMC.

9.8 grams of PSU were added to the mixer and allowed to become molten.

0.2 grams of SMG was added to the molten PSU and mixed.

After 3 minutes of mixing time, 3 grams of the G-PMC was extruded out of the mixer and collected for characterization.

3 grams of 2% SMG in PSU was added to the mixer and mixed.

After 30 minutes of mixing time, 3 grams of the G-PMC was extruded out of the mixer and collected for characterization.

3 grams of 2% SMG in PSU was added to the mixer and mixed.

After 90 minutes of mixing time, 3 grams of the G-PMC was extruded out of the mixer and collected for characterization.

Morphology Analysis

A Zeiss Sigma Field Emission Scanning Electron Microscope (FESEM) with Oxford EDS was used to determine the degree of mechanical exfoliation of graphite into multi-layer graphene or graphene nanoparticles and the thickness of these particles. An accelerating voltage of 3 kV and a working distance of approximately 8.5 mm was used during viewing. Prior to viewing, specimens from each sample of 3G-PMC, 30G-PMC, and 90G-PMC were notched, cryogenically fractured to produce a flat fracture surface, placed under vacuum for at least 24 hours, gold coated, and stored under vacuum.

X-Ray Diffraction Analysis (XRD)

XRD analysis on each sample of 3G-PMC, 30G-PMC, and 90G-PMC includes four steps: (1) sample preparation, (2) diffraction pattern acquisition, (3) profile fitting, and (4) out-of-plane (D) crystallite sizes calculation according to the Debye-Scherrer equation.

The samples for XRD analysis were prepared by pressing thin films of each sample 3G-PMC, 30G-PMC, and 90G-PMC at 230° C. and 5,500 psi over a 2 minute time period. Each sample was positioned between aluminum sheets prior to pressing using a Carver Uniaxial Press with heated platens.

Diffraction patterns of the pressed films were acquired using a Philips XPert powder diffractometer with sample changer (Xpert) at 40 kV and 45 mA with an incident slit thickness of 0.3 mm from 4°-70° 2θ and a step size of 0.02° 2θ.

Diffraction patterns were uploaded into WinPLOTR Powder diffraction graphics tool, without background editing or profile adjustments prior to peak fitting. Single peak fitting was applied at a 2θ range of 26°-27.5°, using a pseudo-Voigt function and taking into account a global FWHM, global eta (proportion of Lorentz), and linear background. Single peak fitting of the profile provides the full width at half maximum (FWHM) of the relevant peak.

The average out-of-plane crystallite size (D) (sometimes referred to as along the c-axis, and proportional to the number of graphene layers which are stacked) is calculated using the Debye-Scherrer Equation and the (002) FWHM values, for which $\lambda$ is the X-ray wavelength, coefficient K=0.89, $\beta$ is the FWHM in radians, and $\theta$ is the diffraction angle. The d-spacing is also calculated.

$$D = \frac{K\lambda}{\beta \cos\theta} \qquad \text{Equation 2}$$

Morphology Results

The morphology of each sample, 3G-PMC, 30G-PMC, and 90G-PMC, at three different scales (magnification), is shown in FIG. 3. In FIGS. 3a, 3b, and 3c, a 20 µm scale and 1,000× magnification shows a good distribution of multi-layer graphene or graphene within the PSU matrix at each mixing time. In FIGS. 3d, 3e, and 3f, a 1 µm scale and 10,000× magnification and FIGS. 3g, 3h, and 3i, a 1 µm scale and 50,000× magnification shows mechanically exfoliated graphite within the PSU matrix. In FIGS. 3d, 3e, 3c, 3d, 3e, 3f, 3g, 3h, and 3i, micro-folding of the multi-layer graphene or graphene is evident, as well as good bonding between the graphene nanoparticles and the polymer matrix.

Figure 4A:
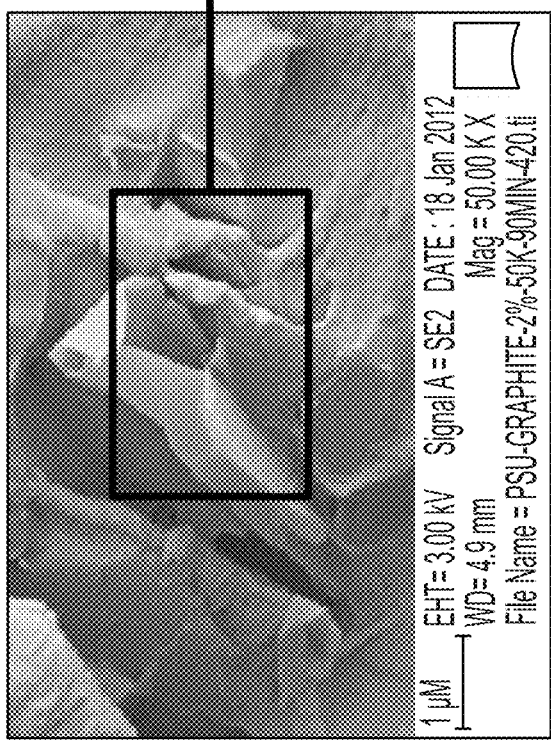
FIGS. 4a, 4b, and 4c (collectively "FIG. 4") illustrate micrographs of 90G-PMC at various scales and magnification levels according to an in situ exfoliation method of the present disclosure.
Figure 4B:
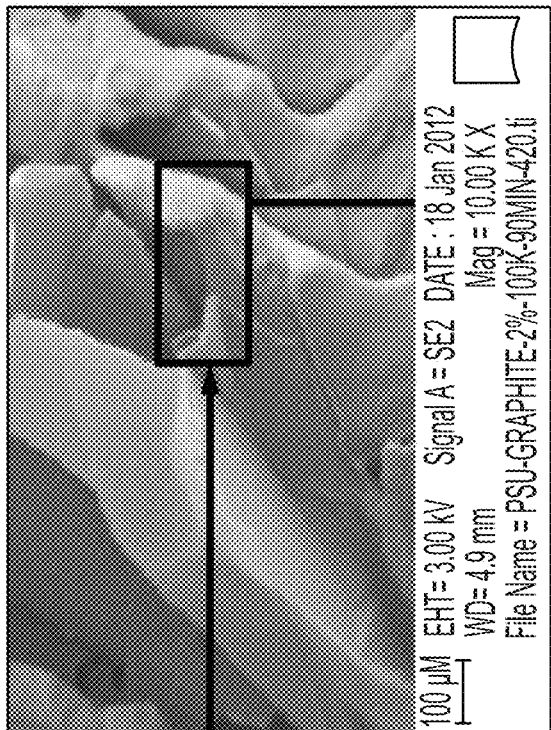
Figure 4C:
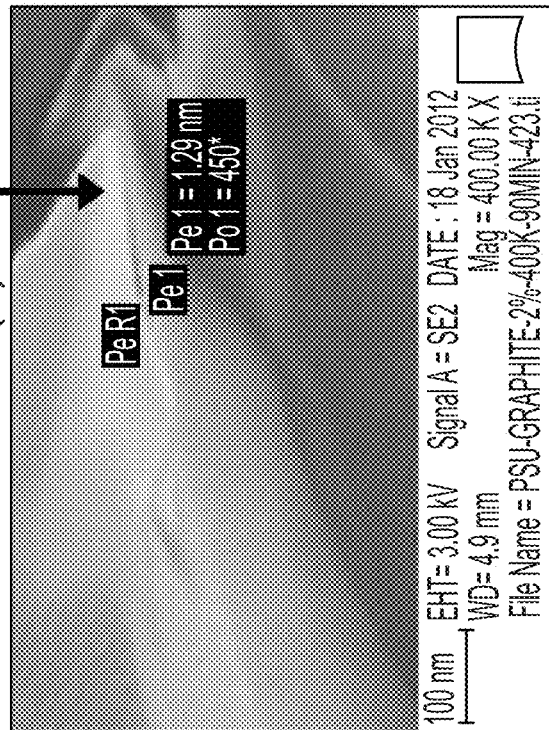

The 90G-PMC sample, which was mixed for the longest time and exposed to the most repetitive shearing, exhibits superior mechanical exfoliation and the smallest crystal size. As shown in FIG. 4, mechanical exfoliation has reduced the graphene nanoparticle thickness in the 90G-PMC sample to 8.29 nm.

X-Ray Diffraction Results

Figure 5:
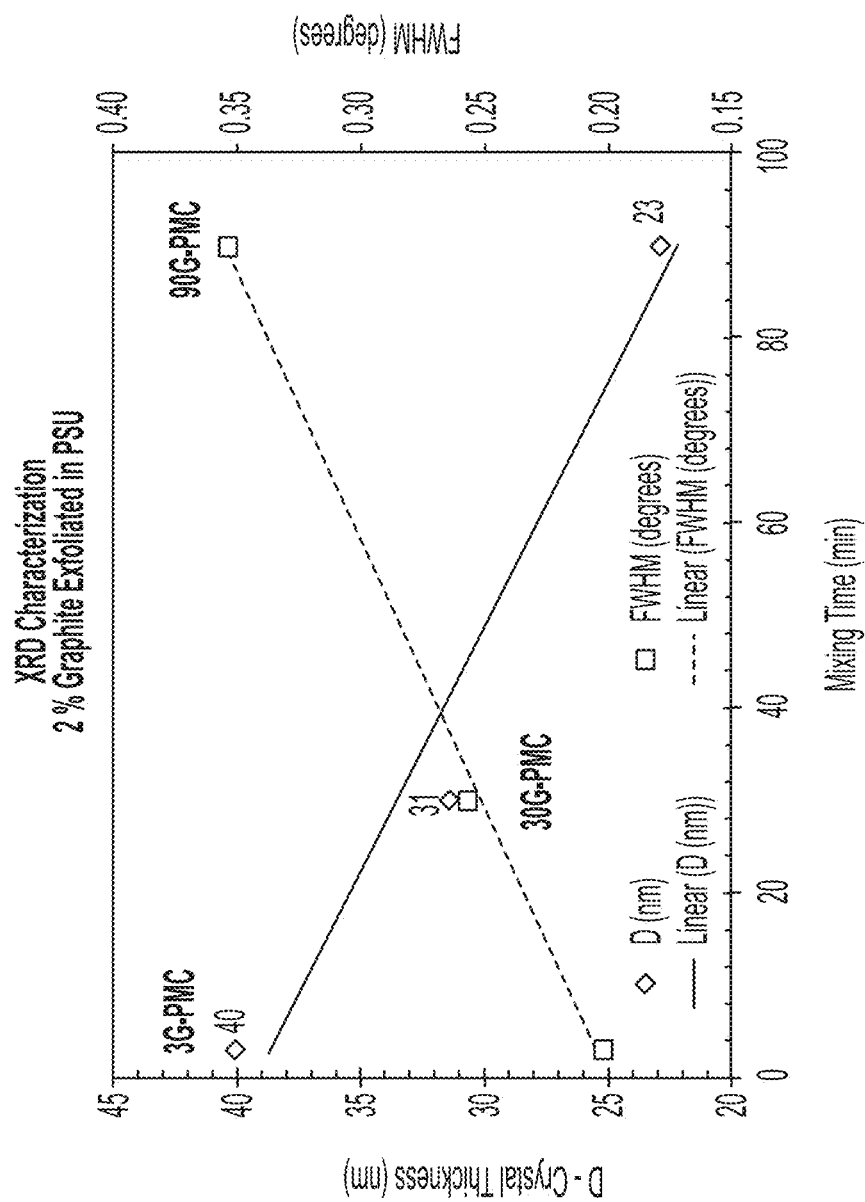
FIG. 5 illustrates a graph of the Debye-Scherrer Equation applied to the average XRD results from each 2% graphite exfoliated in polysulfone according to an in situ exfoliation method of the present disclosure.
Figure 6:
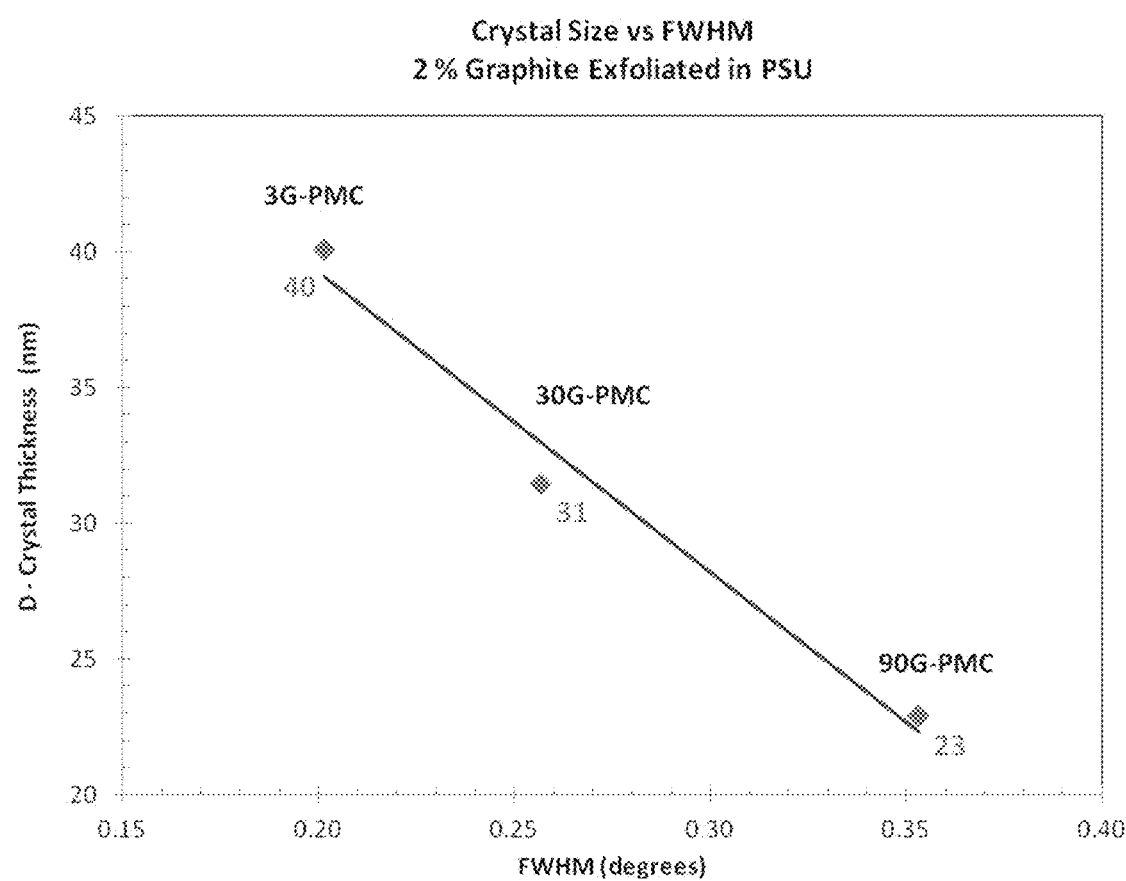
FIG. 6 illustrates a graph depicting the crystal size versus FWHM of 2% graphite exfoliated in polysulfone according to an in situ exfoliation method of the present disclosure.

The Debye-Scherrer equation was applied to the FWHM and d-spacing results obtained from the X-ray diffraction patterns for 3G-PMC, 30G-PMC, and 90G-PMC to provide the crystal thickness (D) of the multi-layer graphene or graphene nanoparticles. The XRD results and crystal thickness appear in Table 1. For the 3G-PMC, 30G-PMC, and 90G-PMC samples, the crystal thickness is 40 nm, 31 nm, and 23 nm; the FWHM is 0.202°, 0.257°, and 0.353°; and the d-spacing is 3.361 nm, 3.353 nm, and 3.387 nm, respectively. The FWHM increases with mixing time, and crystal thickness decreases with mixing time (FIG. 5), which indicates that mechanical exfoliation of the graphite to multi-layer graphene or graphene is occurring and is enhanced over longer mixing times. FIG. 6 shows the decrease in crystal size as a function of FWHM.

TABLE 1

Debye-Scherrer Equation applied to the average XRD results from each 2% Graphite Exfoliated in PSU sample mixed for 3 min, 30 min, and 90 min

| Sample | Mixing Time (min) | (d 002) (nm) | FWHM (degrees) | Average D - Crystal Thickness (nm) Along c-Axis Direction |
|---|---|---|---|---|
| 3G-PMC | 3 | 0.3361 | 0.202 | 40 |
| 30G-PMC | 30 | 0.3353 | 0.257 | 31 |
| 90G-PMC | 90 | 0.3387 | 0.353 | 23 |

Graphene Modification

Mechanical exfoliation of the graphite into multi-layer graphene or graphene as a result of the repetitive shear strain action in the polymer processing equipment generates dangling primary and secondary bonds that provide the opportunity for various chemical reactions to occur, which can be exploited to obtain property enhancement of the G-PMC. This represents an advance over prior art conventional methods forming graphene oxides, where the dangling primary and secondary bonds covalently bond with oxygen, which typically remain in these positions even after the graphene oxide is reduced.

For example, chemical reactions that covalently attach these dangling bonds from the multi-layer graphene or graphene nanoparticles to the polymer matrix would provide superior mechanical properties of the G-PMC. Alternatively, electrical conductivity may be enhanced by chemically linking appropriate band gap materials at the graphene nano-particle edges or by coordinating with conductive metals such as gold, silver, copper, and the like. The graphene-reinforced polymer may then be added to polymers or other compositions to provide or increase electrical conductivity. The bonds may also be coordinated to metals, such as platinum and palladium, to provide a catalyst, with the graphene-reinforced polymer serving as a catalyst support. Other forms of functionalized graphene are disclosed in U.S. Pat. No. 8,096,353, the disclosure of which is incorporated herein by reference.

The disclosed methods are particularly advantageous because in situ functionalization reactions may be performed during the exfoliation process via one-pot reactive compounding.

The graphene-reinforced polymers may be used as electrodes for lightweight batteries. Other uses include composite boat hulls, aircraft, aerospace systems, transportation vehicles, personnel armor, pressure vessels, reactor chambers, spray coatings, polymer powders for 3-D printing, transparent electrodes for electronic device touch screens, and the like. Addition of 1-2 wt % graphene to a polymer matrix imparts electrical conductivity, while maintaining optical transparency, thus enabling applications in solar panels, flat-panel displays, and for static-discharge control in hospitals.

Mechanical exfoliation successfully converted 2% graphite melt-blended with PSU into a G-PMC using a repetitive shearing action in the Randcastle Extrusion System's Small Scale Extension Mixer. Results may be improved by machine modification to increase shear; for example, by using a larger diameter mixing element to increase rotational speed and/or by minimizing the spacing between the mixing element and the cylinder wall.

Modified Randcastle Extrusion System's Small Scale Extension Mixer:

The design of the existing small batch mixer may be modified to provide higher shear rate, which in turn provides superior mechanical exfoliation of graphite within the polymer matrix. The shear rate, $\dot{\gamma}$, is calculated according to Equation 3, where r is the tooling radius and $\Delta r$ is the clearance for compounding. Machine modifications are listed in Table 2, along with the maximum achievable shear rate. The newly designed mixer has a maximum shear rate 22 times that of the current mixer, which will provide enhanced mechanical exfoliation of graphite within a polymer matrix at shorter lengths of time. In other words, the crystal size, D, may be reduced to smaller dimensions in a more efficient length of time.

$$\dot{\gamma} = \left(\frac{RPM}{60}\right)\left(\frac{2\pi r}{\Delta r}\right) \quad \text{Equation 3}$$

TABLE 2

Modifications of the Randcastle Extrusion System's Small Scale Extension Mixer to provide enhanced mechanical exfoliation

| | Current Randcastle Mixer | Improved Randcastle Mixer |
|---|---|---|
| Tooling Radius (inches) | 0.5 | 1 |
| Clearance for Compounding, $\Delta r$ (in) | 0.04 | 0.01 |
| Maximum RPM | 100 | 360 |
| Maximum Shear Strain Rate (sec$^{-1}$) | 133 | 2900 |

2. Modified Single Screw Extrusion:

RANDCASTLE has made modifications to the extruder screw that will better enable mechanical exfoliation of the graphite into multi-layer graphene or graphene in a polymer matrix to fabricate a G-PMC.

The foregoing examples and description of the preferred embodiments should be taken as illustrating, rather than as limiting the present invention as defined by the claims. As will be readily appreciated, numerous variations and combinations of the features set forth above can be utilized without departing from the present invention as set forth in the claims. Such variations are not regarded as a departure from the spirit and scope of the invention, and all such variations are intended to be included within the scope of the following claims.

What is claimed is:

1. A method for forming a graphene-reinforced polymer matrix composite, comprising:
   (a) distributing graphite microparticles into a molten thermoplastic polymer phase, wherein at least 50% by weight of graphite in the graphite microparticles comprises multilayer graphite crystals between 1.0 and 1000 microns thick along a c-axis direction;
   (b) applying a succession of shear strain events to the molten polymer phase so that the shear stress within the molten polymer phase is equal to or greater than the Interlayer Shear Strength (ISS) of the graphite microparticles and the molten polymer phase mechanically exfoliates the graphite successively with each event until the graphite is at least partially exfoliated to form a distribution in the molten polymer phase of essentially pure and uncontaminated single- and multi-layer graphene nanoparticles less than 10 nanometers thick along the c-axis direction; and
   (c) continuing the shear strain events until graphene fractures of the exfoliated single- and/or multi-layer graphene nanoparticles are formed across the basal plane defined by a-axis and b-axis, wherein the edges of the graphene fractures comprise reactive free radical graphenic carbon bonding sites that react with the one or more molten thermoplastic polymers to provide a composite where thermoplastic polymer chains are directly covalently bonded to, and inter-molecularly cross-linked by, the single- and/or multi-layer graphene nanoparticles.

2. The method of claim 1, wherein the composite comprises from about 0.01 wt % to about 90 wt % of particles selected from the group consisting of single- and multi-layer graphene nanoparticles less than 10 nanometers thick along a c-axis direction, partially exfoliated multi-layer graphene nanoparticles from 10 to 1,000 nanometers thick along the c-axis direction, graphite microparticles, and combinations of two or more thereof, wherein from about 5 wt % to less than about 95 wt % of the particles are single- and multi-layer graphene nanoparticles less than 10 nanometers thick along the c-axis direction.

3. The method of claim 2, wherein the composite comprises from about 0.01 wt % to about 60 wt % of the single- and multi-layer graphene nanoparticles.

4. The method of claim 2, wherein the composite comprises from about 0.01 wt % to about 30 wt % of single- and multi-layer graphene nanoparticles.

5. The method of claim 1, wherein the composite comprises at least one thermoplastic polymer molecule bonded or adhered to one or more mechanically exfoliated single- or multi-layer graphene nanoparticles.

6. The method of claim 1, wherein the composite comprises at least one single- or multi-layer graphene nanoparticle covalently bonded to one or more thermoplastic polymer molecules.

7. The method of claim 1, wherein the composite comprises a distribution of a plurality of graphene/polymer clusters, wherein each of the graphene/polymer clusters comprises at least one thermoplastic polymer molecule covalently bonded or adhered to one or more mechanically exfoliated single- or multi-layer graphene nanoparticles.

8. The method of claim 1, wherein the composite comprises a distribution of a plurality of graphene/polymer clusters, wherein each of the graphene/polymer clusters comprises at least one single- or multi-layer graphene nanoparticle covalently bonded to one or more thermoplastic polymer molecules.

9. The method of claim 1, wherein the step of applying a succession of shear strain events comprises applying a succession of shear strain events to generate a shear rate less than or equal to 1000 sec-1.

10. The method of claim 1, wherein the polymer is selected from the group consisting of acrylics, polyamide-imide (PAI), polyetherimide (PEI), polyimide (PI), aromatic thermoplastic polyester, polycarbonate (PC), Polybutadiene (PBD), polydimethylsiloxane (PDMS), polyaryletherketone (PAEK), polyethylene naphthalene dicarboxylate (PEN), polysulphone (PSU, polyphenylene sulfide (PPS), polyethylene), polyglycolic acid (PGA), polylactic acid (PLA), polylactic-glycolic acid copolymer (PLGA), polyoxymethylene plastic (POM/Acetal), polyphenylene ether (PPE or PPO), polypropylene (PP), polystyrene (PS), polytetrafluoroethylene (PTFE/TEFLON), polyvinylchloride (PVC), polyvinylidene fluoride (PVDF), thermoplastic elastomer (TPE), liquid crystal polymer, natural or synthetic rubber, polyamide (PA), and the mixtures of two or more thereof.

11. The method of claim 10, wherein the polyamide is selected from the group consisting of polyamide-11 (nylon-11), polyamide-12 (nylon-12), polyamide-4,6 (nylon-4,6), polyamide-6 (nylon-6), polyamide-6,10 (nylon-6,10), polyamide-6,12 (nylon-6,12), polyamide-6,6 (nylon-6,6), polyamide-6,9 (nylon-6,9).

12. The method of claim 1, wherein the graphite is doped with other elements to modify a surface chemistry of the exfoliated graphene nanoparticles.

13. The method of claim 1, wherein a surface chemistry or nanostructure of the dispersed graphite is modified to enhance bond strength with the polymer matrix to increase strength and stiffness of the composite.

14. The method of claim 1, wherein the graphene nanoparticles are directionally aligned thereby providing one-, two- or three-dimensional reinforcement of the polymer phase.

15. The method of claim 1, wherein the composite comprises residual graphite microparticles.

16. A graphene-reinforced polymer matrix composite comprising: a distribution in a thermoplastic polymer matrix of single- and multi-layer graphene nanoparticles less than 50 nanometers thick along a c-axis direction and graphite microparticles, wherein composite comprises thermoplastic polymer chains inter-molecularly cross-linked by mechanically torn single- and/or multi-layer graphene nanoparticles having carbon atoms with reactive bonding sites on the torn edges of the graphene nanoparticles.

17. The composite of claim 16, comprising: (i) at least one thermoplastic polymer molecule covalently bonded or adhered to one or more mechanically exfoliated single- or multi-layer graphene nanoparticles; or (ii) at least one single- or multi-layer graphene nanoparticle covalently bonded to one or more thermoplastic polymer molecules.

18. The composite of claim 16, comprising a distribution of a plurality of graphene/polymer clusters, wherein each of the graphene/polymer clusters comprises at least one thermoplastic polymer molecule covalently bonded or adhered to one or more mechanically exfoliated single- or multi-layer graphene nanoparticles.

19. The composite of claim 16, comprising from about 0.01 wt % to about 90 wt % of particles selected from the group consisting of single- and multi-layer graphene nanoparticles less than 10 nanometers thick along a c-axis direction, partially exfoliated multi-layer graphene nanoparticles from 10 to 1,000 nanometers thick along the c-axis direction, graphite microparticles, and combinations of two or more thereof, wherein from about 5 wt % to less than about 95 wt % of the particles are single- and multi-layer graphene nanoparticles less than 10 nanometers thick along the c-axis direction.

* * * * *